US011993089B2

(12) United States Patent
Torikai et al.

(10) Patent No.: US 11,993,089 B2
(45) Date of Patent: May 28, 2024

(54) HEAD SYSTEM, LIQUID DISCHARGING DEVICE, PRINTING DEVICE, AND METHOD FOR SUPPLYING LIQUID

(71) Applicant: BROTHER KOGYO KABUSHIKI KAISHA, Nagoya (JP)

(72) Inventors: Kosuke Torikai, Nagoya (JP); Hirotoshi Ishizaki, Nagakute (JP); Motohiro Tsuboi, Nagoya (JP); Itsuki Morimoto, Nagoya (JP); Yuki Takahashi, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 175 days.

(21) Appl. No.: 17/704,913

(22) Filed: Mar. 25, 2022

(65) Prior Publication Data

US 2022/0314670 A1 Oct. 6, 2022

(30) Foreign Application Priority Data

Mar. 30, 2021 (JP) ................................ 2021-057460
Mar. 30, 2021 (JP) ................................ 2021-057461

(51) Int. Cl.
*B41J 29/377* (2006.01)

(52) U.S. Cl.
CPC .................................. *B41J 29/377* (2013.01)

(58) Field of Classification Search
CPC ............ B41J 29/377; B41J 2002/14459; B41J 2/14233; B41J 2/175; B41J 2202/08;
(Continued)

(56) References Cited

U.S. PATENT DOCUMENTS

2003/0128254 A1* 7/2003 Ison .................... B41J 2/14209 347/49
2009/0141064 A1* 6/2009 Shihoh .................... B41J 2/515 347/18

(Continued)

FOREIGN PATENT DOCUMENTS

JP 2011-207064 A 10/2011
JP 5975039 B2 8/2016
JP 2020-157680 A 10/2020

OTHER PUBLICATIONS

Partial European Search Report issued in corresponding European Patent Application No. 22164502.1, dated Sep. 2, 2022.

(Continued)

*Primary Examiner* — Jason S Uhlenhake
*Assistant Examiner* — Alexander D Shenderov
(74) *Attorney, Agent, or Firm* — Merchant & Gould P.C.

(57) ABSTRACT

The head system includes: a plurality of heads disposed staggered along a first direction; a sub-tank disposed above the heads and configured to distribute a liquid to each of the heads; a plurality of liquid channels; a chiller configured to cool the heads, including a manifold disposed between the heads and the sub-tank in an up-down direction; and a casing having a pair of inner surfaces opposed to each other in a second direction orthogonal to the first direction and the up-down direction. Each of the liquid channels extends linearly parallel to the up-down direction in an entire region between the sub-tank and one of the heads. Each of the plurality of liquid channels and the manifold are aligned in the second direction between the pair of inner surfaces of the casing.

25 Claims, 21 Drawing Sheets

(58) Field of Classification Search
CPC ................ B41J 2202/20; B41J 2/17553; B41J 2/17513; B41J 2/18
USPC ........................................................... 347/18
See application file for complete search history.

(56) References Cited

U.S. PATENT DOCUMENTS

| | | | | |
|---|---|---|---|---|
| 2013/0010027 | A1* | 1/2013 | Yamada ..................... | B41J 2/18 347/17 |
| 2013/0208053 | A1* | 8/2013 | Iwanaga ............. | B41J 2/14427 347/61 |
| 2018/0022092 | A1 | 1/2018 | Mori | |

OTHER PUBLICATIONS

Extended European Search Report issued in corresponding European Patent Application No. 22164502.1, dated Nov. 30, 2022.

* cited by examiner

HEAD SYSTEM, LIQUID DISCHARGING DEVICE, PRINTING DEVICE, AND METHOD FOR SUPPLYING LIQUID

CROSS REFERENCE TO RELATED APPLICATIONS

The present application claims priority from Japanese Patent Application No. 2021-057460, filed on Mar. 30, 2021, and Japanese Patent Application No. 2021-057461 filed on Mar. 30, 2021, the disclosure of each of which is incorporated herein by reference in its entirety.

BACKGROUND

The present disclosure relates to a head system, a liquid discharging device, a printing device, and a method for supplying a liquid.

There exists an image recording device that discharges onto a medium such as a paper sheet a liquid such as ink via a liquid discharging head. Such an image recording device employs a structure in which a plurality of the liquid discharging heads are disposed staggered along a width direction of the medium (that is, a direction orthogonal to a direction that the medium is conveyed during image recording) and are held integrally by a casing.

SUMMARY

According to a first aspect of the present disclosure, there is provided a head system including, a plurality of heads, a sub-tank, a plurality of liquid channels, a chiller and a casing.

The plurality of heads is disposed staggered along a first direction.

The sub-tank is disposed above the plurality of heads and is configured to distribute a liquid to each of the plurality of heads.

Each of the plurality of liquid channels fluidly connects the sub-tank and one of the plurality of heads.

The chiller is configured to cool the plurality of heads by a coolant, the chiller including a manifold which is disposed between the plurality of heads and the sub-tank in an up-down direction and which extends in the first direction to distribute the coolant to the plurality of heads.

The casing has a pair of inner surfaces opposed to each other in a second direction orthogonal to the first direction and the up-down direction, the casing housing the sub-tank, the chiller, and the plurality of liquid channels.

Each of the plurality of liquid channels extends linearly parallel to the up-down direction in an entire region between the sub-tank and one of the plurality of heads.

Each of the plurality of liquid channels and the manifold are aligned in the second direction between the pair of inner surfaces of the casing.

According to a second aspect of the present disclosure there is provided a liquid discharging device including, a head system and a controller.

the head system is a head system according to the first aspect.

The controller is configured to control the head system.

The head system further comprises a sub-tank heater configured to heat the liquid in the sub-tank.

The controller is configured to control the head system such that a rise amount of temperature of the liquid due to the heater is larger than a rise amount of temperature of the liquid due to the sub-tank heater.

According to a third aspect of the present disclosure, there is provided a printing device including, a conveying device, a plurality of head systems, and a frame.

The conveying device is configured to convey a medium in a conveying direction along a conveying surface.

The frame is configured to support the plurality of head systems.

Each of the plurality of head systems is a head system according to the first aspect.

The frame supports the plurality of head system such that the conveying direction matches with the second direction of each of the plurality of head systems, and nozzle surfaces of the plurality of heads face the conveying surface.

According to a fourth aspect of the present disclosure, there is provided a method for supplying a liquid to a plurality of heads in a head system, the method including: feeding the liquid to a sub-tank via a supply channel, while raising a temperature of the liquid by $\Delta$T1° C. by controlling a heater configured to heat the liquid in the supply channel with a controller configured to control the head system;

then, raising a temperature of the liquid by $\Delta$T2° C. smaller than $\Delta$T1° C. in the sub-tank by controlling a sub-tank heater configured to heat the liquid in the sub-tank with the controller; and then, feeding the liquid in the sub-tank to each of the plurality of heads.

According to a fifth aspect of the present disclosure, there is provided a head system including a plurality of heads, a sub-tank, a supply channel, a heater, and a casing.

The sub-tank is connected to each of the plurality of heads and is configured to distribute a liquid to each of the plurality of heads.

The supply channel is configured to supply the liquid to the sub-tank.

The heater is configured to heat the liquid in the supply channel.

The casing houses the sub-tank, the supply channel, and the heater.

BRIEF DESCRIPTION OF THE DRAWINGS

In FIG. 14, some configurations are see-through in order to explain disposition.

DETAILED DESCRIPTION

The present disclosure has an object of providing a compact head system and a printing device comprising the head system.

The present disclosure additionally has an object of providing a head system, a liquid discharging device, a printing device (an image forming device), and a method for supplying a liquid that enable temperature adjustment of a liquid to be supplied to a liquid discharging head to be suitably performed.

The present disclosure makes it possible to provide a compact head system and a printing device comprising the head system.

The present disclosure makes it possible to provide a head system, a liquid discharging device, a printing device (an image forming device), and a method for supplying a liquid that enable temperature adjustment of a liquid to be supplied to a liquid discharging head to be suitably performed.

[Embodiment]

A head system 100 and a printer (a printing device) 1000 being one embodiment of the present disclosure will be described with reference to FIGS. 1 to 23.

<Printer 1000>

Figure 1:
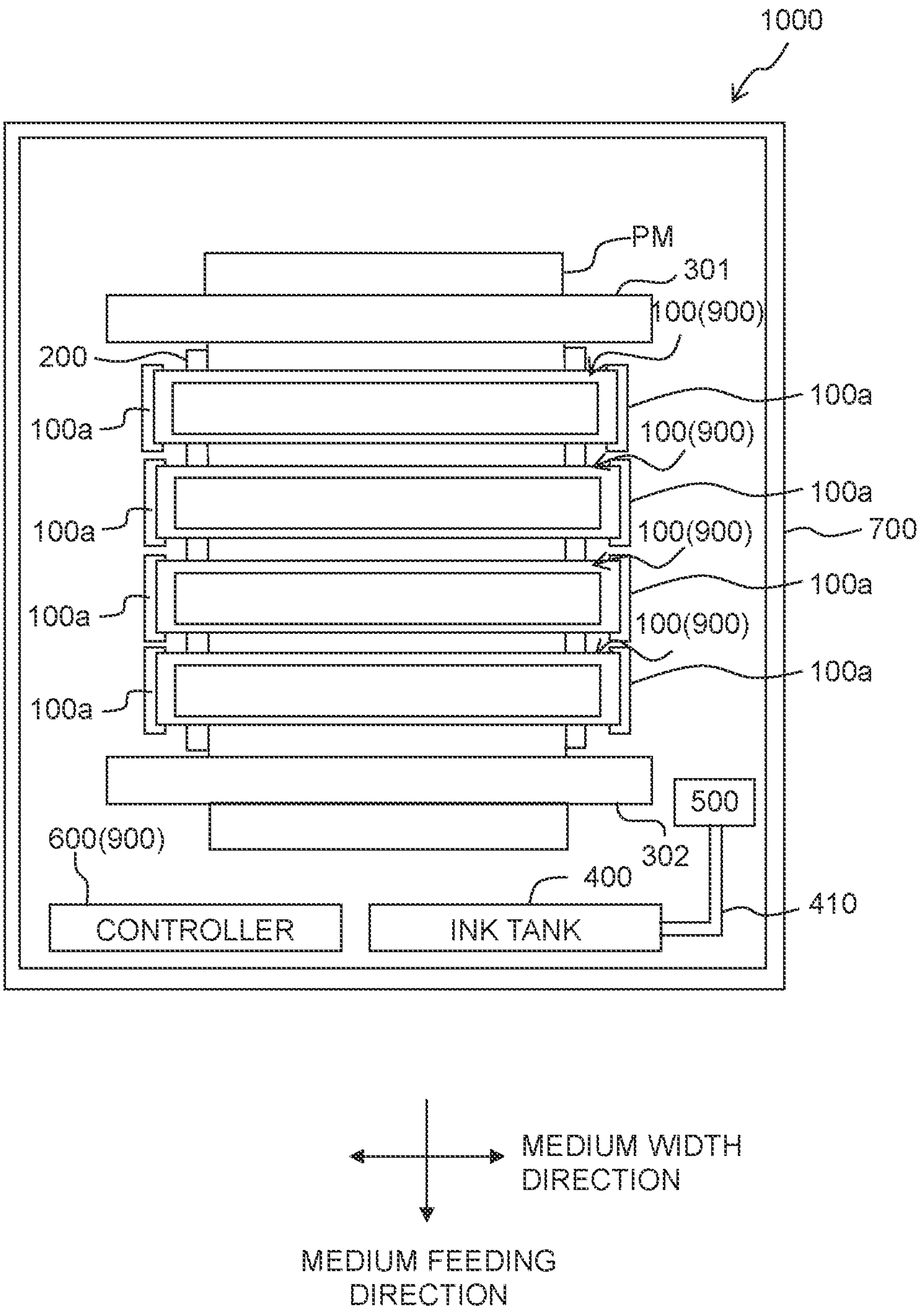
FIG. 1 is a schematic configuration diagram of a printer.

As depicted in FIG. 1, the printer 1000 mainly comprises four of the head systems 100, a platen 200, a pair of conveying rollers 301, 302 as a conveying device, an ink tank 400, a reservoir 500, a controller (control unit) 600, and a casing (housing) 700 that houses these.

Regarding the printer 1000, a direction that the pair of conveying rollers 301, 302 are aligned, that is, a direction that a medium PM is conveyed during image formation will be called a "medium feeding direction". Moreover, a direction extending in a horizontal plane and orthogonal to the medium feeding direction will be called a "medium width direction".

Each of the four head systems 100 is a so-called line type head (a head bar), and is supported at both end portions thereof in the medium width direction by a frame 100*a*. The frame 100*a* supports each of the four head systems 100 so that the medium feeding direction (a conveying direction) of the printer 1000 matches with a front-rear direction (mentioned later) of each of the four head systems 100, and nozzle surfaces 40*n* (mentioned later) of the four head systems 100 face an upper surface of the platen 200. In FIG. 1, the frame 100*a* is provided to each of the head systems 100. However, the four head systems 100 may be collectively supported by a single frame 100*a*.

In the present embodiment, each of the four head systems 100 is configured to discharge two kinds out of four mutually differing kinds of inks. These four kinds of inks are, for example, cyan ink, magenta ink, yellow ink, and black ink. The ink may be an ultraviolet curing type ink (a UV ink). Specific structure and function of the head system 100 will be mentioned later.

The platen 200 is a plate-like member that supports the medium PM from an opposite side to the head system 100 (from below), when ink is discharged toward the medium PM from the head system 100. Hence, the upper surface of the platen 200 corresponds to a conveying surface of the medium PM.

The pair of conveying rollers 301, 302 are disposed (arranged) sandwiching the platen 200 in the medium feeding direction. The pair of conveying rollers 301, 302 function as the conveying device that feeds the medium PM in the medium feeding direction in a certain form, when an image is formed on the medium PM by the head system 100.

The ink tank 400 is divided into four to enable it to house the four colors of inks. The four colors of inks are fed to the reservoir 500 by a duct 410. The reservoir 500 too is divided into four to enable it to house the four colors of inks. Each color of ink that has been fed to the reservoir 500 is circulated between the reservoir 500 and the head system 100 via an unillustrated duct and unillustrated pump.

The controller 600 carries out overall control of each of portions configuring the printer 1000 to cause each of the portions to perform image formation on the medium PM, and so on. The controller 600 comprises an FPGA (Field Programmable Gate Array), an EEPROM (Electrically Erasable Programmable Read-Only Memory), a RAM (Random Access Memory), and so on. Note that the controller 600 may comprise the likes of a CPU (Central Processing Unit) or an ASIC (Application Specific Integrated Circuit). The controller 600 is data-communication-capably connected to an external device such as a PC (not illustrated), and controls each of the portions of the printer 1000 based on printing data sent from said external device.

A liquid discharging device (liquid discharge device) 900 of the present embodiment comprises the controller 600 and at least one head system 100.

<Head System 100>

Figure 2:
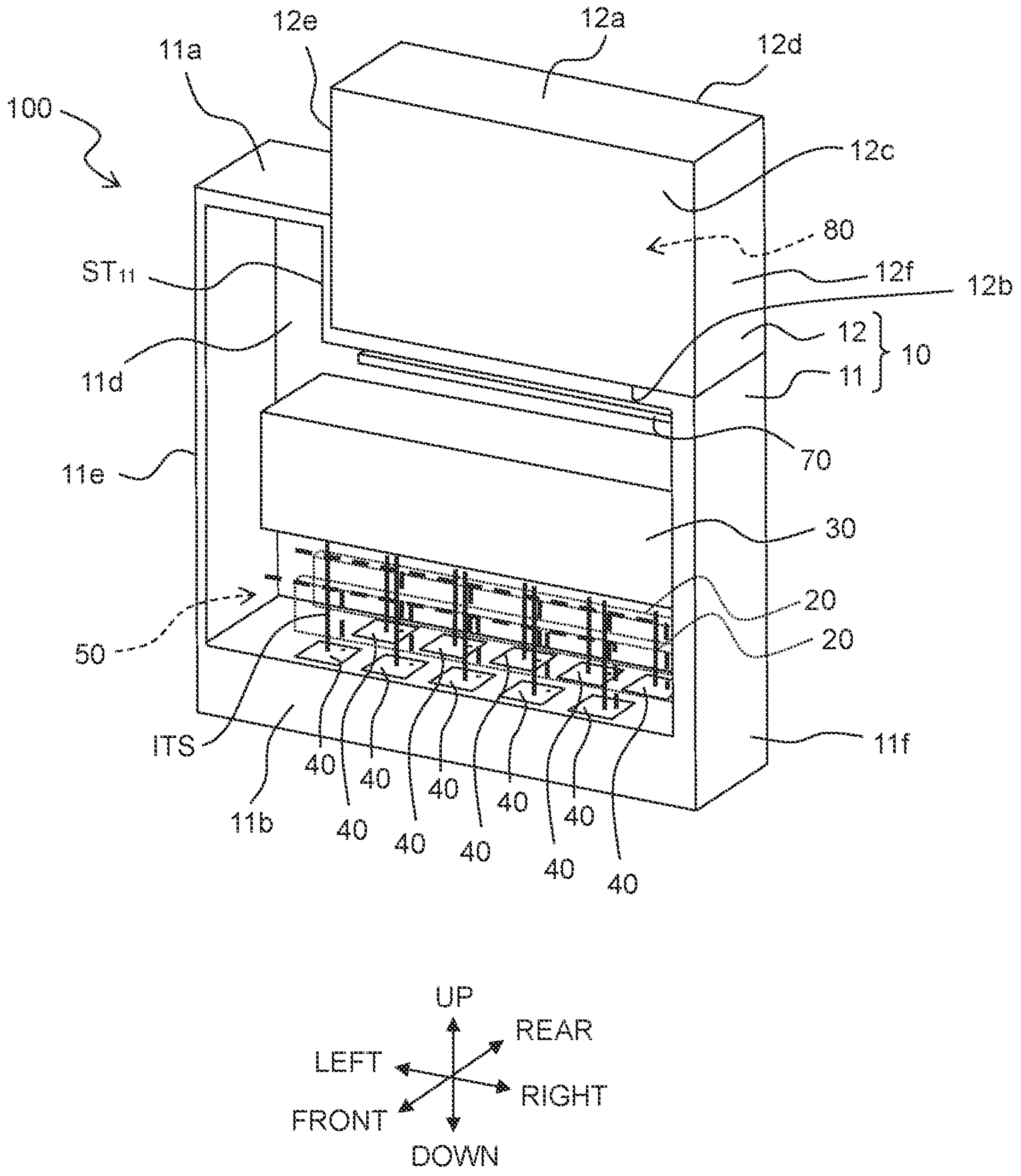
FIG. 2 is a schematic perspective view of a head system.

As depicted in FIG. 2, each of the four head systems 100 mainly comprises a casing (housing) 10, and, housed in the casing 10, two preheating channels 20, a sub-tank 30, ten head mechanisms 40, ten sets of ink tube sets ITS linking the sub-tank 30 and the ten head mechanisms 40, a coolant circulation mechanism 50, a relay board 70, and a control board unit 80. Since the four head systems have the same configuration as each other, hereafter, description will be made focusing on one of the four.

In the description below, a direction that the ten head mechanisms 40 are aligned staggered (in a zigzag manner) will be called a width direction of the head system 100 (a first direction), and a direction that the ten head mechanisms 40 and the sub-tank 30 are aligned will be called an up-down direction. Moreover, a direction orthogonal to the width direction and the up-down direction will be called the front-rear direction of the head system 100 (a second direction).

Regarding the front-rear direction, a near side and far side of a paper surface of FIG. 2 will be assumed to be a front side and rear side in the front-rear direction. Regarding the width direction, a left side and right side when looking from the front side in the front-rear direction will be assumed to be a left side and right side in the width direction. Regarding the up-down direction, a side that the sub-tank 30 is positioned with respect to the ten head mechanisms 40 will be assumed to be an upper side, and an opposite side thereto will be assumed to be a lower side.

Note that in a state of the head system 100 having been installed in the printer 1000, the width direction of the head system 100 corresponds to (matches with) the medium width direction of the printer 1000, and the front-rear direction of the head system 100 corresponds to (matches with) the medium feeding direction of the printer 1000.

<Casing 10>

The casing 10 may be formed by a metal, for example. The casing 10 includes: a first portion 11; and a second portion 12 attachable/detachable to/from the first portion 11.

The first portion 11 has a top plate 11*a* and bottom portion 11*b*, a front wall 11*c* (FIG. 18; illustration of the front wall 11*c* is omitted in FIG. 2 to render visible inside the first portion 11), a rear wall 11*d*, a left wall (side wall) 11*e*, and a right wall 11*f*. The top plate 11*a* and bottom portion 11*b* have a rectangular shape long in the width direction in planar view. The top plate 11*a*, which has a step portion $ST_{11}$, has its left end vicinity positioned above another region (a region rightward of the left end vicinity) thereof. The front wall 11*c* and rear wall 11*d* are each a flat plate extending along a plane including the width direction and the up-down direction, and the left wall 11*e* and right wall 11*f* are each a flat plate extending along a plane including the front-rear direction and the up-down direction. The left wall 11*e* and right wall 11*f* are orthogonal to the front wall 11*c* (a rear surface of the front wall 11*c*) and rear wall 11*d* (a front surface of the rear wall 11*d*).

Figure 3:
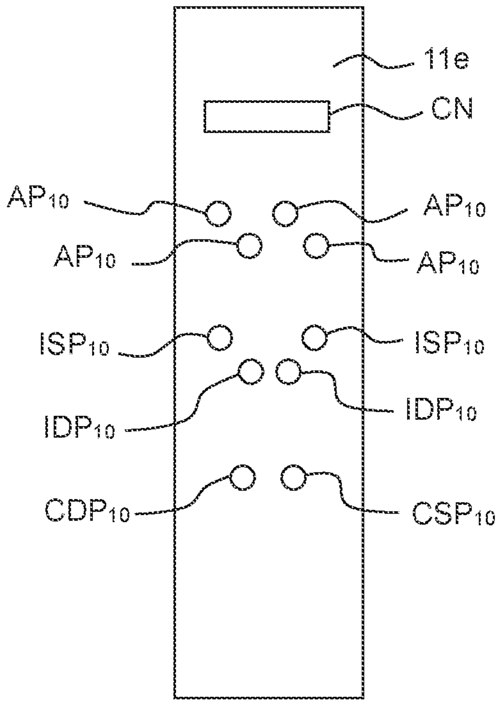
FIG. 3 is a plan view in which a left wall of a first portion of a casing is viewed from an outer side (a left side).

As depicted in FIG. 3, an upper portion of the left wall 11*e* is provided with an electrical connector CN, and below the electrical connector CN, there are provided four air flow ports $AP_{10}$. Below the four air flow ports $AP_{10}$, there are provided two ink supply ports $ISP_{10}$ and two ink discharge ports $IDP_{10}$, and below these, there are provided a coolant supply port $CSP_{10}$ and a coolant discharge port $CDP_{10}$. Note that in FIG. 2, illustration of the electrical connector CN, the air flow ports $AP_{10}$, and each of the supply ports and discharge ports is omitted.

Thus, by the electrical connector CN being disposed above the ink supply ports $ISP_{10}$, the ink discharge ports $IDP_{10}$, the coolant supply port $CSP_{10}$, and the coolant discharge port $CDP_{10}$, an electrical short circuit can be prevented from occurring in the electrical connector CN, even when ink or coolant (for example, water) has leaked from each of the supply ports or each of the discharge ports. Moreover, when an insulative ink such as UV ink, for example, is employed as the ink, a risk of electrical short circuit occurrence in the case of it having leaked is smaller than in the case of water leakage. Hence, by the coolant supply port $CSP_{10}$ and the coolant discharge port $CDP_{10}$ being disposed below the ink supply ports $ISP_{10}$ and the ink discharge ports $IDP_{10}$, the risk of electrical short circuit occurrence is further reduced.

As depicted in FIG. 2, the second portion 12 has a top plate 12*a*, a bottom plate 12*b*, a front wall 12*c*, a rear wall 12*d*, a left wall 12*e*, and a right wall 12*f*. In a state of the second portion 12 having been fitted to the first portion 11, the bottom plate 12*b* of the second portion 12 abuts on a right end vicinity of the top plate 11*a* of the first portion 11.

<Preheating Channel 20>

The preheating channel 20 feeds to the sub-tank 30 ink that has been supplied to the head system 100 via the ink supply port $ISP_{10}$ of the casing 10, and, at the same time, raises the temperature of the ink.

As depicted in FIG. 2, two of the preheating channels 20 are disposed aligned in the front-rear direction in a vicinity of the bottom portion 11*b* of the first portion 11 of the casing 10. Each of the two preheating channels 20 has a long shape, and has its longitudinal direction disposed matching with the width direction of the head system 100. Moreover, the preheating channel 20 is positioned on a downstream side of the ink supply port $ISP_{10}$ and an upstream side of the sub-tank 30 in a flow direction of the ink. Note that the preheating channel 20 of FIG. 2 is depicted by dotted lines, in order to allow visual observation of a structure positioned on its far side.

As depicted in FIGS. 4A to 4D, each of the two preheating channels 20 has: a channel block 21; a heater module 22 thermally connected to the channel block 21; and a radiation sheet 23 affixed to the channel block 21.

The channel block 21 passes ink along a channel defined (demarcated) on its inside, and, while doing so, applies heat from the heater module 22 to the ink. The channel block 21 is preferably formed by a material having a high heat transfer coefficient, and may be formed by a metal such as aluminum, for example.

The channel block 21 has: a main body portion 211; and heater support pieces 212, 213 formed integrally with the main body portion 211.

The main body portion 211 is rectangular bar shaped, and extends along the width direction of the head system 100. The main body portion 211 has a front surface 211*c* and a rear surface 211*d* that extend along a plane orthogonal to the front-rear direction of the head system 100.

Figure 4A:
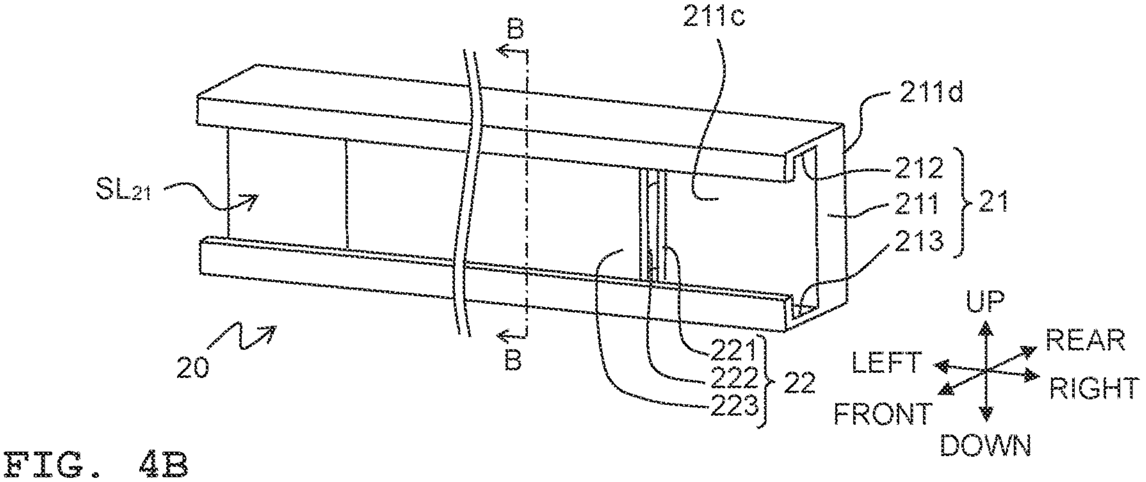
FIG. 4A is a perspective view of a preheating channel.
Figure 4B:
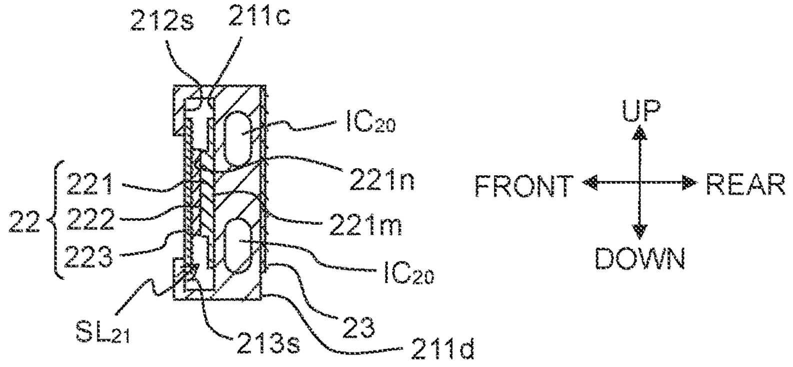
FIG. 4B is a cross-sectional view taken along the line B-B of FIG. 4A.
Figure 4C:
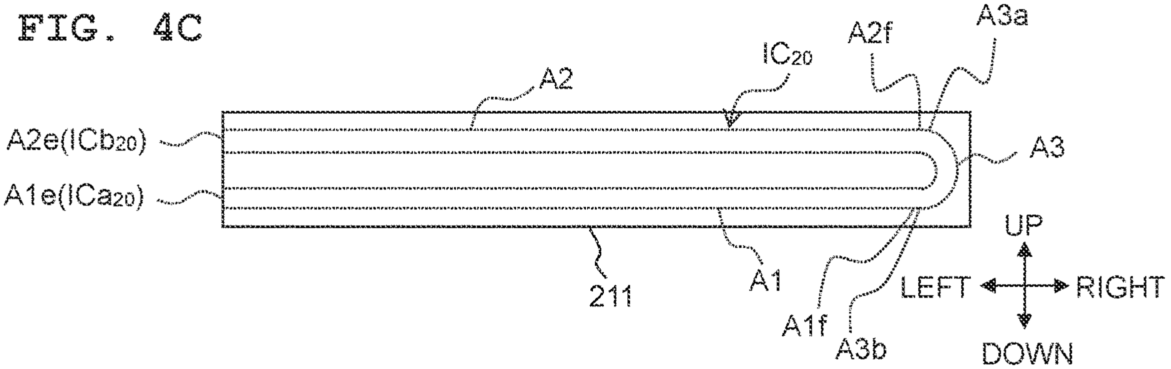
FIG. 4C is a view depicting disposition of an ink channel within a channel block.

As depicted in FIGS. 4B and 4C, an ink channel $IC_{20}$ is defined inside the main body portion 211. The ink channel $IC_{20}$ includes: a linear first portion A1 extending in a longitudinal direction of the main body portion 211 (that is, the left-right direction) in a plane including the left-right direction and the front-rear direction; a linear second portion A2 positioned above the first portion A1 and extending parallel to the first portion A1; and a U-shaped turnback portion A3 linking a right end Alf of the first portion A1 and a right end A2*f* of the second portion A2. A left end Ale of the first portion A1 is an upstream end $ICa_{20}$ of the ink channel $IC_{20}$. The right end Alf of the first portion A1 is connected to a lower end A3*b* of the turnback portion A3. A left end A2*e* of the second portion A2 is a downstream end $ICb_{20}$ of the ink channel $IC_{20}$. The right end A2*f* of the second portion A2 is connected to an upper end A3*a* of the turnback portion A3.

As depicted in FIG. 4B, a cross-sectional shape of the ink channel $IC_{20}$ is an ellipse or oval. Along axis of the ellipse corresponds to (matches with) the up-down direction, and a short axis of the ellipse corresponds to (matches with) the front-rear direction. When the cross-sectional shape of the ink channel $IC_{20}$ is configured as an ellipse, it is easier for a contact area between the ink flowing along the ink channel $IC_{20}$ and the main body portion 211 to be made large, compared to when the cross-sectional shape is a perfect circle. Hence, heat from the heater module 22 can be efficiently applied to the ink, and a generated heat amount of the heater module 22 required for warming the ink can be reduced. As a result, excessive temperature rise of the heater module 22 can be suppressed, and, consequently, excessive temperature rise in the casing 10 can be suppressed.

A channel length of the ink channel $IC_{20}$, that is, a channel length between the upstream end $ICa_{20}$ and the downstream end $ICb_{20}$ is about 600 mm to 900 mm, for example. Moreover, a cross-sectional area of the ink channel $IC_{20}$ (an area of a cross section in a plane orthogonal to a direction that the channel extends) is about 5 $mm^2$ to 15 $mm^2$, for example. These channel length and cross-sectional area, which are a channel length and cross-sectional area of the channel defined within the channel block 21, are a channel length and cross-sectional area of a region where warming of ink by the heater module 22 is performed.

The channel length of the ink channel $IC_{20}$ is larger than a dimension in the left-right direction of first through fourth reservoir portions R1-R4 (mentioned later) of the sub-tank 30. Moreover, the cross-sectional area of the ink channel $IC_{20}$ is smaller than an area of a cross section in a plane orthogonal to the left-right direction of each of the first through fourth reservoir portions R1-R4 of the sub-tank 30.

The heater support piece 212 is an angular portion projecting forwards and bending downwards from an upper edge of the front surface 211*c* of the main body portion 211, and has a surface 212*s* facing the front surface 211*c* (FIG. 4B). The heater support piece 213 is an angular portion projecting forwards and bending upwards from a lower edge of the front surface 211*c* of the main body portion 211, and has a surface 213*s* facing the front surface 211*c*.

A slit $SL_{21}$ casing the heater module 22 is defined by the front surface 211*c* and the heater support pieces 212, 213.

The heater module 22 generates heat for applying to the channel block 21. The heater module 22 has: a heater 221; a heat-dissipating (heat-radiating, heat-releasing) sheet 222; and a metal plate 223.

The heater 221 is a long planar (belt-like) heater. The heater 221 has: a long heat-generating surface 221*m*; and an opposite surface 221*n* on an opposite side to the heat-generating surface 221*m*.

The heat-dissipating sheet 222 releases to outside of the preheating channel 20 excess heat generated by the heater 221. The heat-dissipating sheet 222 may be configured as a long planar (belt-like) member formed by an elastic material having a high heat transfer coefficient, such as silicone, for example.

The heat-dissipating sheet 222 is bonded to the heater 221 with its longitudinal direction matched with a longitudinal direction of the heater 221. Specifically, one surface of the heat-dissipating sheet 222 is bonded to the opposite surface 221*n* of the heater 221.

The metal plate 223 releases to outside of the preheating channel 20 excess heat transmitted to the heat-dissipating sheet 222 from the heater 221. The metal plate 223 may be configured as a long flat plate formed by a material having a high heat transfer coefficient, for example, aluminum.

The metal plate 223 is bonded to the heat-dissipating sheet 222 with its longitudinal direction matched with a longitudinal direction of the heat-dissipating sheet 222. Specifically, one surface of the metal plate 223 is bonded to an entire region of a surface on an opposite side to a surface bonded to the heater 221 of the heat-dissipating sheet 222.

The heater module 22 is inserted into the slit $SL_{21}$ to be disposed therein. In this state, the heat-dissipating sheet 222 is compressed in a thickness direction, whereby the heater 221 and the metal plate 223 are respectively pressed rearwards and frontwards. As a result, the heat-generating surface 221*m* of the heater 221 is closely or tightly in contact with the front surface 211*c* of the main body portion 211, and the metal plate 223 is closely or tightly in contact with the surfaces 212*s*, 213*s* of the heater support pieces 212, 213.

Figure 4D:
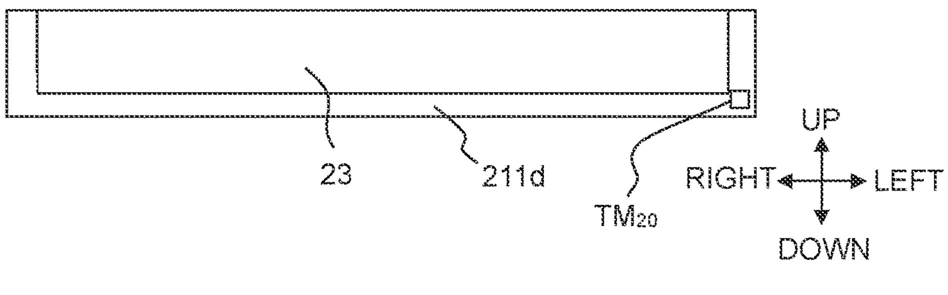
FIG. 4D is a side view in which the channel block is viewed from the rear.

The radiation sheet 23 is provided for efficiently radiating heat of the channel block 21 to outside. As depicted in FIG. 4D, the radiation sheet 23 is affixed (attached) to the rear surface 211*d* in a region excluding a lower edge vicinity and both end portion vicinities in a longitudinal direction of the rear surface 211*d* of the main body portion 211 of the channel block 21. The radiation sheet 23 may be configured as a sheet formed by a material having a higher radiation rate than the channel block 21, for example, a carbon sheet, heat radiating silicone, or the like.

A temperature measuring device $TM_{20}$ is affixed to a vicinity of a left lower end of the rear surface 211*d*, that is, a vicinity of the upstream end $ICa_{20}$ of the ink channel $IC_{20}$. The temperature measuring device $TM_{20}$ is a thermistor, for example. The temperature measuring device $TM_{20}$ measures a temperature of ink flowing into the ink channel $IC_{20}$. The temperature of ink that has been measured by the temperature measuring device $TM_{20}$ is sent to the controller 600 via the relay board 70 (mentioned later).

<Sub-Tank 30>

The sub-tank 30 receives the ink that has had its temperature raised in the preheating channel 20, and stores the ink. In addition, the sub-tank 30 performs temperature raising of the stored ink too. The ink stored in the sub-tank 30 is distributed to each of the plurality of head mechanisms 40.

As depicted in FIG. 2, the sub-tank 30 is disposed above the two preheating channels 20. The sub-tank 30, which has a long shape, is disposed so that its longitudinal direction coincides with the width direction of the head system 10. Moreover, the sub-tank 30 is positioned on a downstream side of the preheating channels 20 and an upstream side of the plurality of head mechanisms 40 in the flow direction of the ink.

Figure 5:
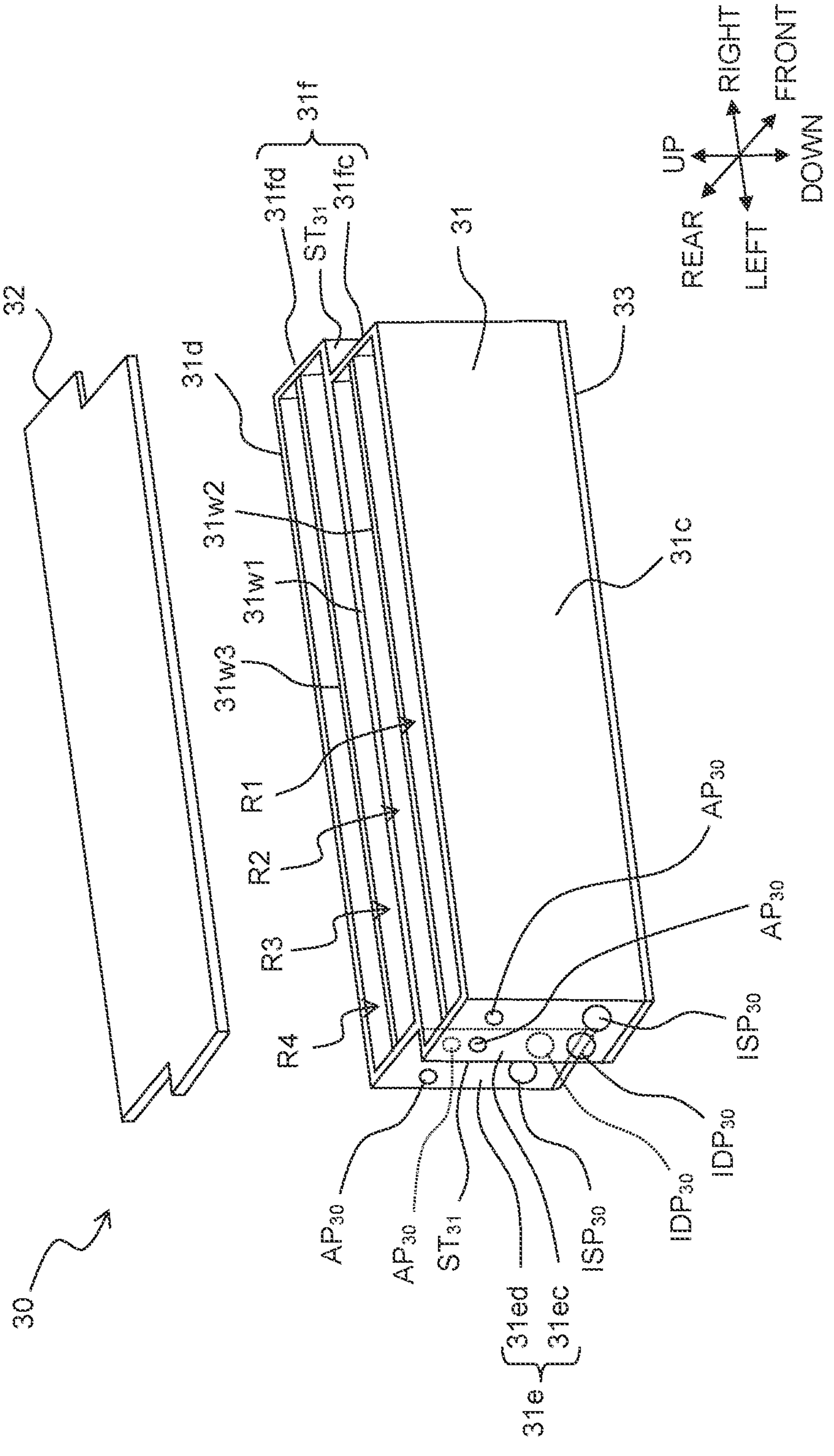
FIG. 5 is an exploded perspective view in which a top plate of a sub-tank has been separated from the sub-tank.
Figure 6:
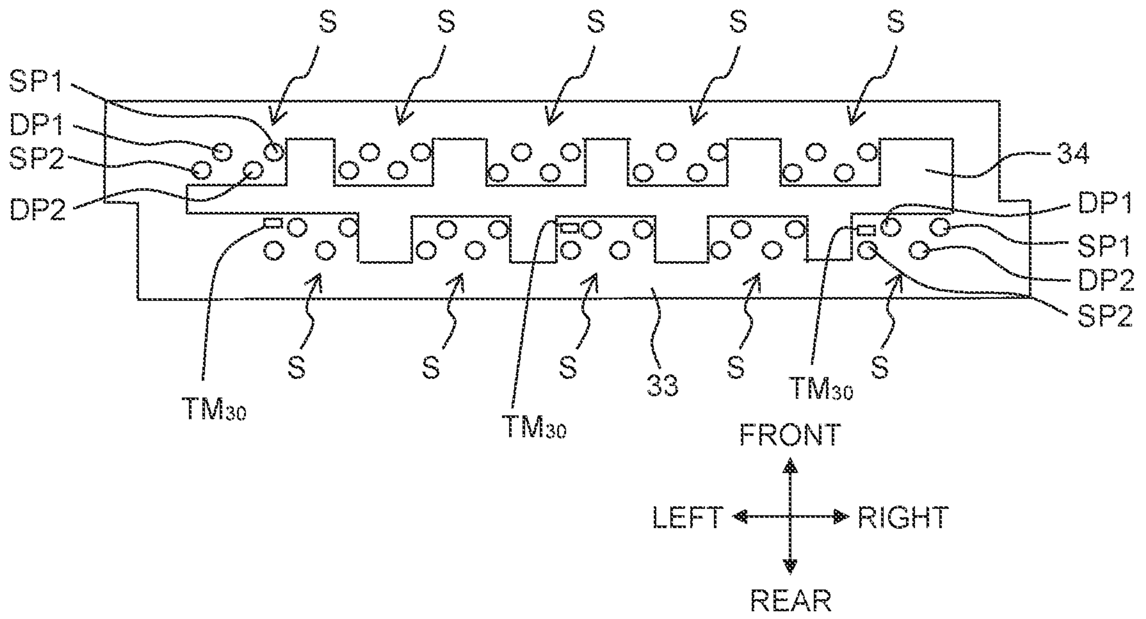
FIG. 6 is a bottom surface view of the sub-tank.

As depicted in FIGS. 5 and 6, the sub-tank 30 is configured by: a main body portion 31; a top plate 32; and a bottom plate 33. A sub-tank heater 34 (FIG. 6) is affixed (attached) to a lower surface of the bottom plate 33.

The main body portion 31 is formed by a resin such as a POM, for example. Thermal conductivity of these resins is about 0.1 to 0.5 W/m K.

The main body portion 31 has: a front wall 31*c* and rear wall 31*d* that extend along a plane orthogonal to the front-rear direction of the head system 100; and a left wall 31*e* and right wall 31*f* that extend along a plane orthogonal to the width direction of the head system 100.

The left wall 31*e* and right wall 31*f* each have a step portion $ST_{31}$ in their center portion in the front-rear direction. Moreover, front-side portions 31*ec*, 31*fc* positioned on front sides of the step portions $ST_{31}$ in the left wall 31*e* and right wall 31*f* are positioned leftward of rear-side portions 31*ed*, 31*fd* positioned on rear sides of the step portions $ST_{31}$ in the left wall 31*e* and right wall 31*f*.

The front-side portion 31*ec* has an ink supply port $ISP_{30}$ provided forwardly in its lower edge vicinity, and has an ink discharge port $IDP_{30}$ provided rearwardly in its lower edge vicinity. Moreover, the front-side portion 31*ec* has two air flow ports $AP_{30}$ provided aligned to front and rear in its upper edge vicinity. The rear-side portion 31*ed* has an ink supply port $ISP_{30}$ provided rearwardly in its lower edge vicinity, and has an ink discharge port $IDP_{30}$ provided forwardly in its lower edge vicinity. Moreover, the rear-side portion 31*ed* has two air flow ports $AP_{30}$ provided aligned to front and rear in its upper edge vicinity.

The main body portion 31 further has a first separating wall 31*w*1, a second separating wall 31*w*2, and a third separating wall 31*w*3 that are parallel to the front wall 31*c* and rear wall 31*d* and extend over a space between the left wall 31*e* and right wall 31*f*.

The first separating wall 31*w*1 is provided in the same position as the step portions $ST_{31}$ of the left wall 31*e* and right wall 31*f* in the front-rear direction. The second separating wall 31*w*2 is provided between the ink supply port $ISP_{30}$ and ink discharge port $IDP_{30}$ and between the two air flow ports $AP_{30}$ in the front-side portion 31*ec* of the left wall 31*e* in the front-rear direction. The third separating wall 31*w*3 is provided between the ink supply port $ISP_{30}$ and ink discharge port $IDP_{30}$ and between the two air flow ports $AP_{30}$ in the rear-side portion 31*ed* of the left wall 31*e* in the front-rear direction.

The top plate 32 is a flat plate formed by a metal, for example. A planar view shape of the top plate 32 is the same as a shape of outline of the main body portion 31 viewed from above. The top plate 32 is fixed to an upper end portion of the main body portion 31 with unillustrated sealing rubber sandwiched therebetween.

The bottom plate 33 is a flat plate formed by a metal (for example, aluminum, copper, stainless steel, or the like). Thermal conductivities of these metals, being at a level of approximately 20 to 400 W/m K, are larger than the thermal conductivity of the resin forming the main body portion 31. A planar view shape of the bottom plate 33 is the same as the shape of outline of the main body portion 31 viewed from above.

As depicted in FIG. 6, a lower surface of the bottom plate 33 is provided with ten (ten sets of) ink flow port sets S. Each of the ink flow port sets S includes a first ink supply port SP1, a second ink supply port SP2, a first ink discharge port DP1, and a second ink discharge port DP2.

The ten ink flow port sets S are disposed staggered (in a zigzag manner) along the width direction of the head system 100. Moreover, in each ink flow port set S, the first ink supply port SP1, the second ink supply port SP2, the first ink discharge port DP1, and the second ink discharge port DP2 are disposed staggered (in a zigzag manner) along the width direction.

The bottom plate 33 is fixed to a lower end portion of the main body portion 31 with unillustrated sealing rubber sandwiched therebetween.

As depicted in FIG. 5, due to the main body portion 31, the top plate 32, and the bottom plate 33, an inside of the sub-tank 30 has defined therein, in order from its front side, the first reservoir portion R1, the second reservoir portion R2, the third reservoir portion R3, and the fourth reservoir portion R4.

A dimension in a longitudinal direction of each of the first through fourth reservoir portions R1-R4, that is, a dimension between the left wall 31*e* and right wall 31*f* is about 300 mm to 500 mm, for example. Moreover, a cross-sectional area of each of the first through fourth reservoir portions R1-R4 (an area of a cross section in a plane including the front-rear direction and the up-down direction of the head system 100) is about 1000 $mm^2$ to 1500 $mm^2$, for example.

Figure 7:
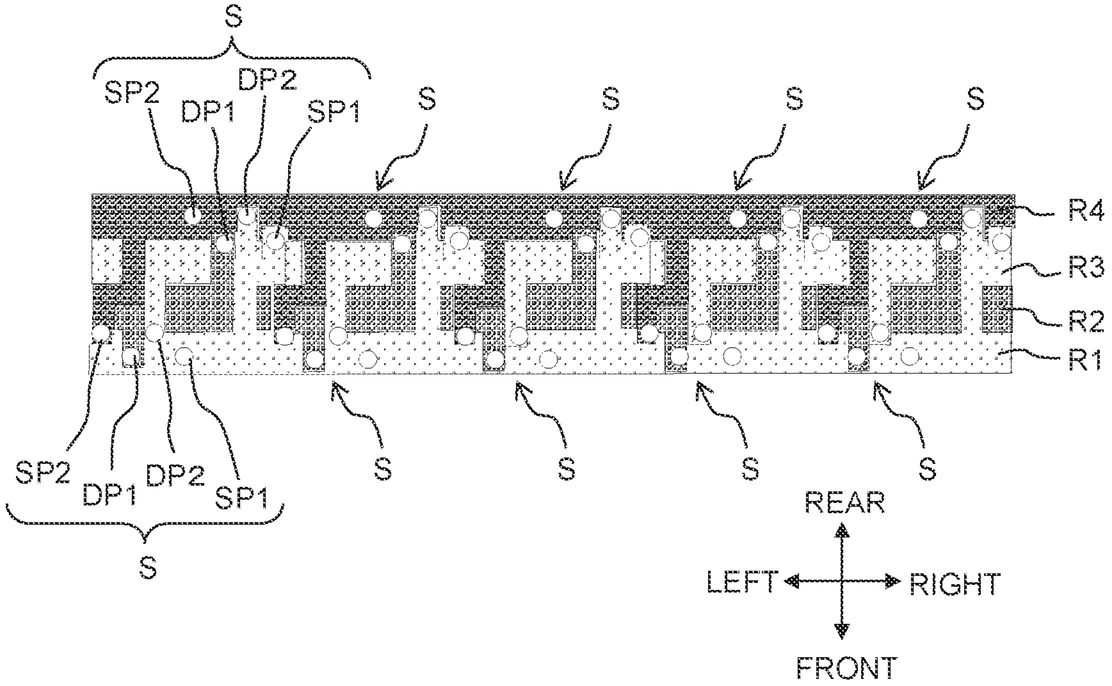
FIG. 7 is an explanatory diagram depicting a connection relationship of each of reservoir portions of the sub-tank and each of flow ports of an ink flow port set.

FIG. 7 depicts how the first reservoir portion R1, the second reservoir portion R2, the third reservoir portion R3, and the fourth reservoir portion R4 are connected to the ink flow port sets S. Since FIG. 7 is an upper surface view and FIG. 6 is a bottom surface view, disposition of the ten ink flow port sets S and disposition of each of the supply ports and discharge ports in the two drawings are upwardly/downwardly inverted on paper surfaces of the drawings.

As depicted in FIG. 7, the first reservoir portion R1 communicates with the first ink supply port SP1 of each ink flow port set S (the supply port positioned on a right front side in each set). The second reservoir portion R2 communicates with the first ink discharge port DP1 of each ink flow port set S (the discharge port positioned on a left front side in each set). The third reservoir portion R3 communicates with the second ink discharge port DP2 of each ink flow port set S (the discharge port positioned on a right rear side in each set). The fourth reservoir portion R4 communicates with the second ink supply port SP2 of each ink flow port set S (the supply port positioned on a left rear side in each set).

Figure 8:
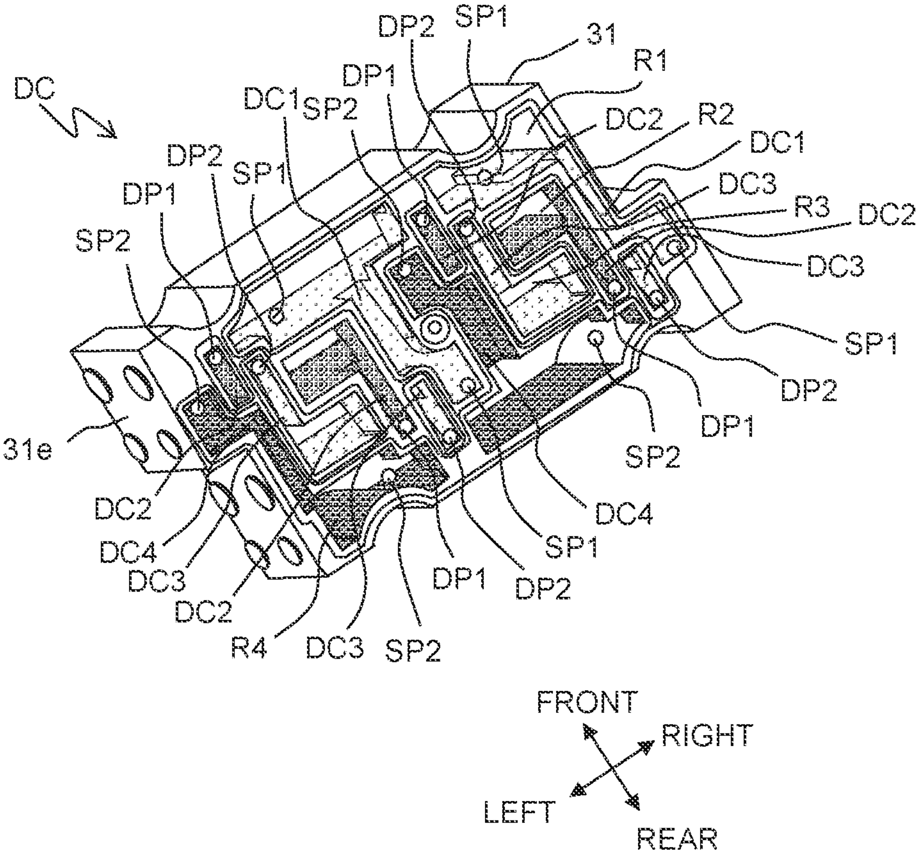
FIG. 8 is a partial bottom surface perspective view of a main body portion of the sub-tank, and depicts a structure of a distribution channel connecting each of the reservoir portions of the sub-tank and each of the flow ports of the ink flow port set.

This configuration is realized by providing distribution channels DC depicted in FIG. 8 in a vicinity of the lower end portion of the main body portion 31, for example. The distribution channels DC, which are defined by three-dimensional structures formed integrally with each wall of the main body portion 31, include a tunnel-like channel DC1 linking the first reservoir portion R1 and the first ink supply port SP1, a tunnel-like channel DC2 linking the second reservoir portion R2 and the first ink discharge port DP1, a tunnel-like channel DC3 linking the third reservoir portion R3 and the second ink discharge port DP2, and a tunnel-like channel DC4 linking the fourth reservoir portion R4 and the second ink supply port SP2. Note that FIG. 8 depicts only a vicinity of the left wall 31*e* of the main body portion 31.

Disposition of the channels DC1-DC4 is not limited to the disposition depicted in FIG. 8, and there may be configured any mode in which channels leading from bottom portions of each of the first through fourth reservoir portions R1-R4 to corresponding supply ports or discharge ports are provided so as not to interfere with each other. Moreover, the distribution channels DC may be formed inside a channel member of a separate body from the main body portion 31.

The sub-tank heater 34 applies heat to the ink stored in the first through fourth reservoir portions R1-R4. The sub-tank heater 34, which is a planar heater similar to the heater 221 of the preheating channel 20, is provided on a bottom surface of the bottom plate 33 (FIG. 6).

In the present embodiment, the sub-tank heater 34 is attached or affixed to the bottom surface of the bottom plate 33 so as to be positioned between the ink flow port sets S in the front-rear direction and width direction of the head system 100. Heat generated by the sub-tank heater 34 is applied to the ink in the distribution channels DC and in the first through fourth reservoir portions R1-R4 via the bottom plate 33 which is a metal plate.

Ink that has been warmed in bottom portions of the first through fourth reservoir portions R1-R4 moves to upper portions of the first through fourth reservoir portions R1-R4 due to temperature rise. As a result, a convection current of ink occurs inside each of the first through fourth reservoir portions R1-R4, and the ink inside the first through fourth reservoir portions R1-R4 is therefore efficiently heated.

The four air flow ports $AP_{30}$ of the left wall 31*e* are respectively connected to the four air flow ports $AP_{10}$ of the casing 10 by unillustrated ducts. An inside of each of the first through fourth reservoir portions R1-R4 is divided into a liquid phase where the ink is stored and a gaseous phase, above the liquid phase, where air is present. By making pressure of the gaseous phase of the first reservoir portion R1 and fourth reservoir portion R4 larger than pressure of the gaseous phase of the second reservoir portion R2 and third reservoir portion R3 via the air flow ports $AP_{10}$, $AP_{30}$, an ink flow from the first reservoir portion R1 and fourth reservoir portion R4 to the second reservoir portion R2 and third reservoir portion R3 via the head mechanism 40 is caused.

As depicted in FIG. 6, the first, third, and fifth from left ink flow port sets S, of the five ink flow port sets S aligned on the rear side in the front-rear direction of the head system 100 have temperature measuring devices $TM_{30}$ provided one each in their vicinities. The temperature measuring device $TM_{30}$ is a thermistor, for example.

The temperature measuring device $TM_{30}$ measures a temperature of ink flowing out from the sub-tank 30. The temperature of ink that has been measured by the temperature measuring device $TM_{30}$ is sent to the controller 600 via the relay board 70 (mentioned later).

<Head Mechanism 40>

The head mechanism 40 discharges toward the medium PM ink that has been supplied from the sub-tank 30. In addition, the head mechanism 40 performs temperature raising of the ink flowing along inside the head mechanism 40, too.

Figure 9:
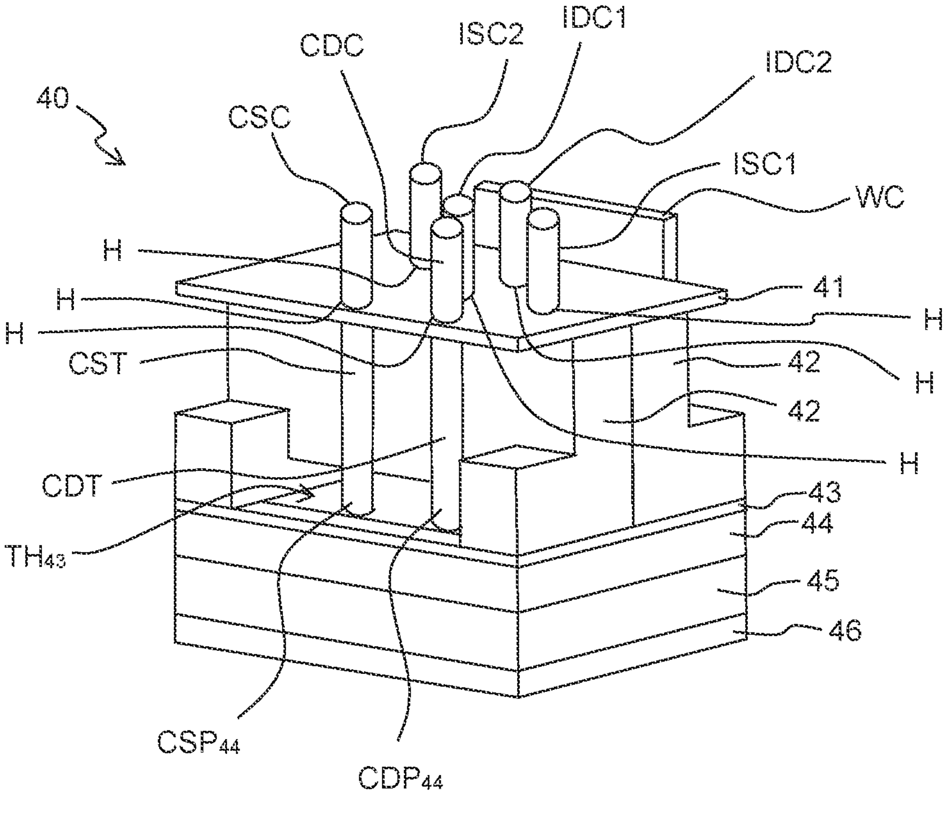
FIG. 9 is a perspective view of a head mechanism.
Figure 11:
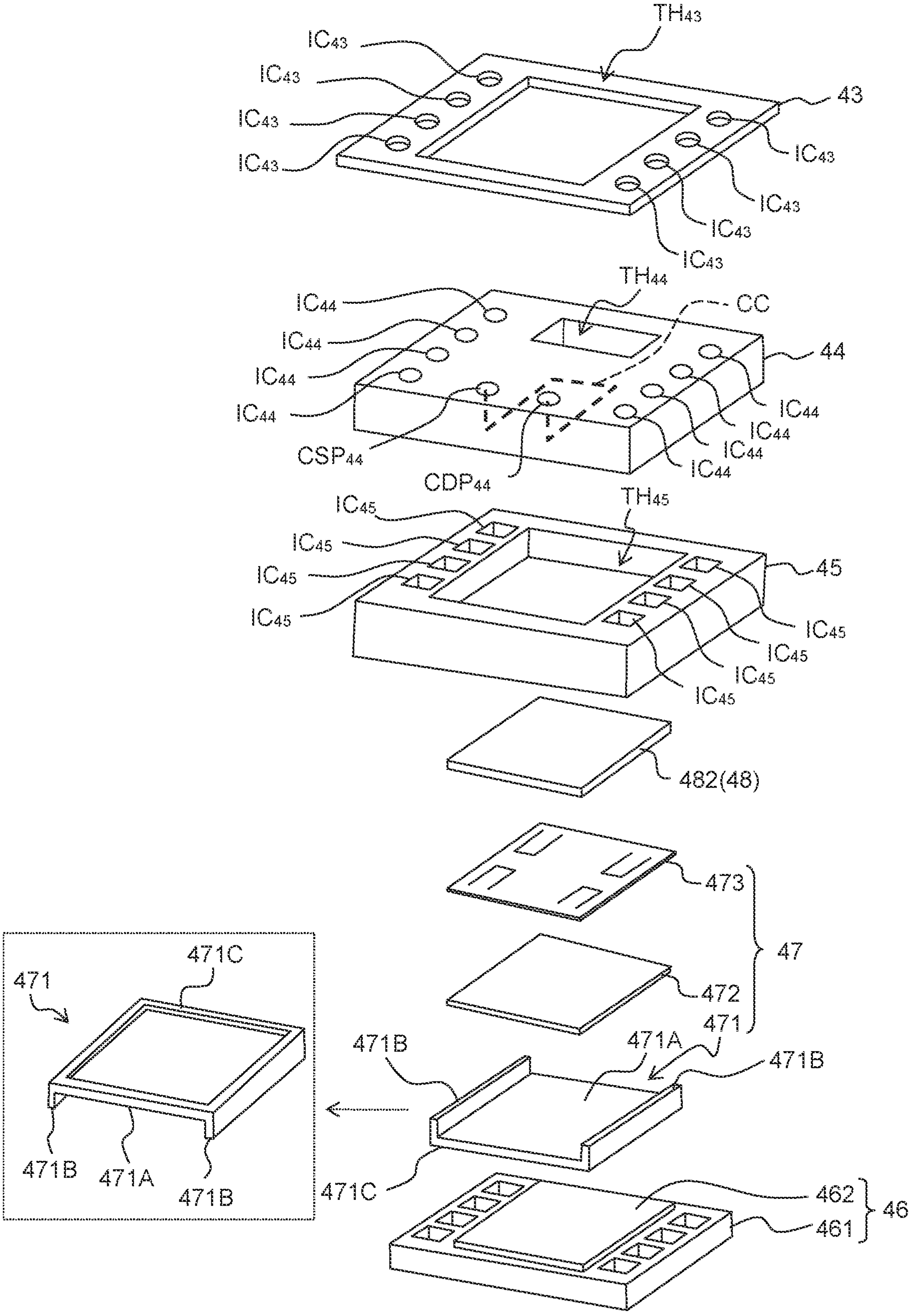
FIG. 11 is an exploded perspective view depicting a configuration further to a lower side than the channel block in the head mechanism. The portion in a box is a perspective view of a heat transfer member viewed from a lower side.
Figure 14:
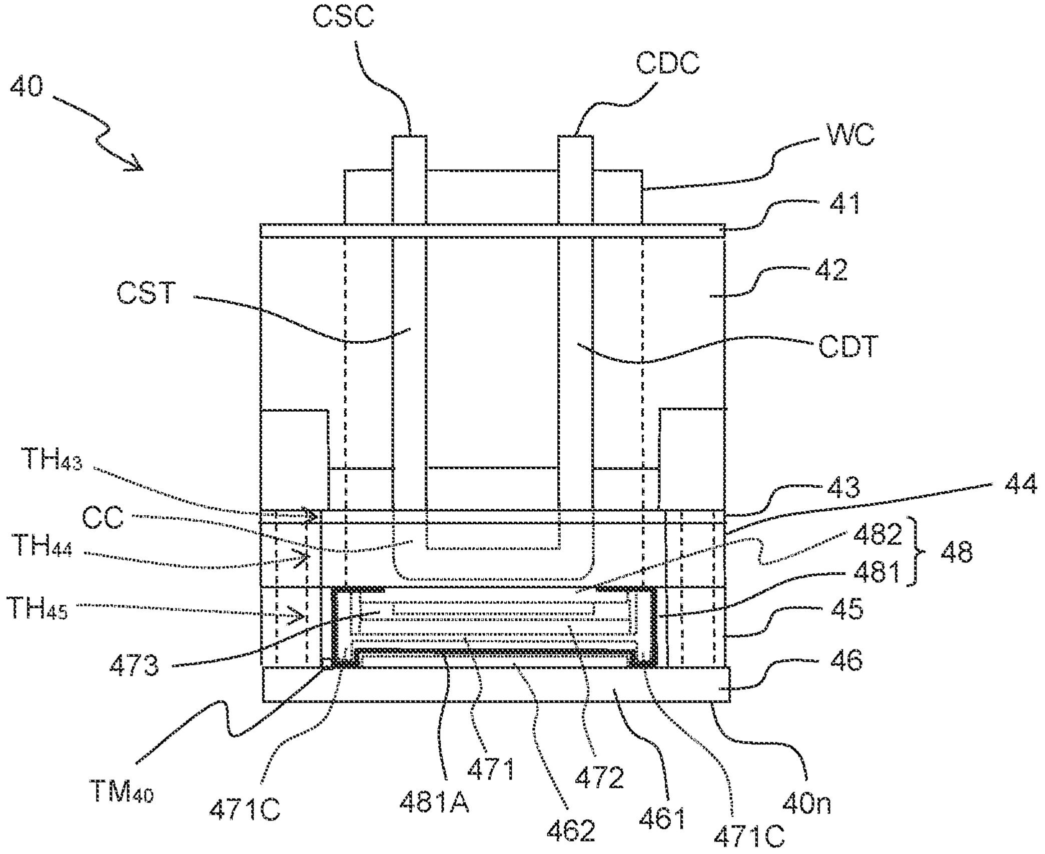
FIG. 14 is a side view of the head mechanism.

As depicted in FIG. 9, each of the ten head mechanisms 40 has, in order from above, a connection plate 41, a pair of channel blocks 42, an alignment frame 43, a cooling frame 44, a front-end frame 45, and a head 46. As depicted in FIGS. 11 and 14, an inside of the front-end frame 45 is provided with a head heater mechanism 47 and a discharge controller 48. The head mechanism 40 further has a wiring connection portion WC extending in the up-down direction over a space between upwards of the connection plate 41 and the front-end frame 45, as depicted in FIG. 14.

As depicted in FIG. 9, the connection plate 41 is a plate-like member for connecting the head mechanism 40 and each of ducts (conduits) connected to the head mechanism 40. The connection plate 41 is provided with six holes H that penetrate the connection plate 41 in a thickness direction.

The six holes H of the connection plate 41 are respectively inserted with a first ink supply tube connecting portion ISC1, a second ink supply tube connecting portion ISC2, a first ink discharge tube connecting portion IDC1, a second ink discharge tube connecting portion IDC2, a coolant supply tube connecting portion CSC, and a coolant discharge tube connecting portion CDC.

Each of the connecting portions ISC1, ISC2, IDC1, IDC2, CSC, and CDC is a cylindrical member. A lower end portion of each connecting portion is provided with an O-ring (not illustrated) surrounding said lower end portion. Each connecting portion is inserted in the hole H with the O-ring positioned in the hole H, and thereby projects to an upper surface side of the connection plate 41. In this state, each connecting portion extends in the up-down direction orthogonally to the connection plate 41.

An upper end portion of each connecting portion is configured to be connected with a one-touch joint (a joint configured so that connection and fixing of a tubular member and the joint is completed merely by the tubular member being inserted in the joint). That is, each connecting portion is a one-touch joint-dedicated tubular member to be connected with a one-touch joint.

The upper end portions of the first and second ink supply tube connecting portions ISC1, ISC2, the first and second ink discharge tube connecting portions IDC1, IDC2, the coolant supply tube connecting portion CSC, and the coolant discharge tube connecting portion CDC are in the same position in the up-down direction. That is, upper end surfaces of the first and second ink supply tube connecting portions ISC1, ISC2, the first and second ink discharge tube connecting portions IDC1, IDC2, the coolant supply tube connecting portion CSC, and the coolant discharge tube connecting portion CDC are flush with each other. Thus, by the upper end portions of each of the connecting portions being positioned at the same height, work to connect each of ink tubes to each of the connecting portions can be made easy.

The pair of channel blocks 42 define on a lower side of the connection plate 41 a channel that supplies to the head 46 ink that has been supplied from the sub-tank 30 and a channel that discharges to the sub-tank 30 ink that has not been discharged (ejected) by the head 46.

Figure 10:
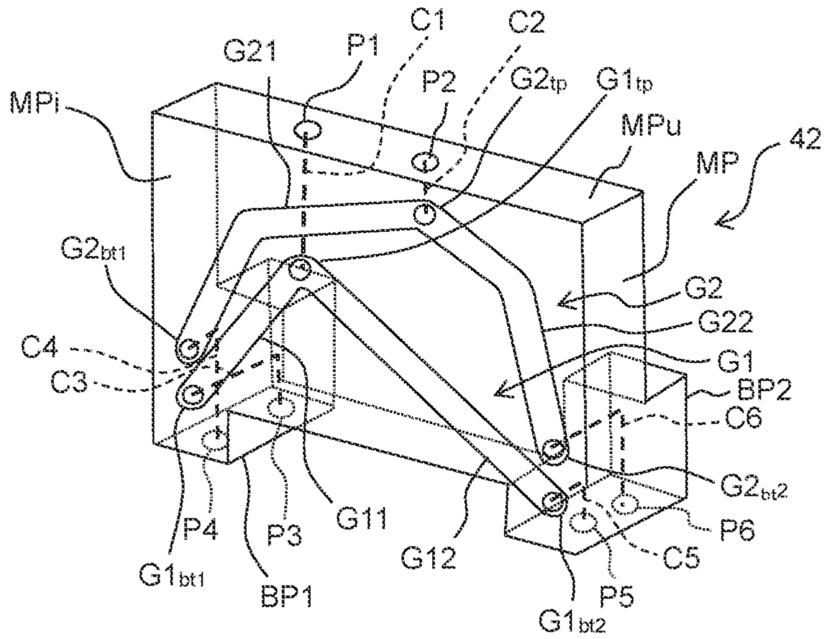
FIG. 10 is a perspective view of a channel block of the head mechanism.

Each of the pair of channel blocks 42 is formed by a resin such as POM, for example, and, as depicted in FIG. 10, has: a rectangular plate-like main portion MP; and a first base portion BP1 and second base portion BP2 that project from the main portion MP.

An upper surface MPu of the main portion MP has formed therein flow ports P1, P2 aligned in a long side direction of the main portion MP. A lower surface of the first base portion BP1 has formed therein flow ports P3, P4 aligned in a thickness direction of the main portion MP, and a lower surface of the second base portion BP2 has formed therein flow ports P5, P6 aligned in the thickness direction of the main portion MP.

A surface MPi of the main portion MP has formed therein: a first concave groove G1; and a second concave groove G2. The first concave groove G1 includes: a first portion G11 extending obliquely downwardly toward the first base portion BP1 from a top $G1_{tp}$ to a lower end portion $G1_{bt1}$; and a second portion G12 extending obliquely downwardly toward the second base portion BP2 from the top $G1_{tp}$ to a lower end portion $G1_{bt2}$. The second concave groove G2 includes: a first portion G21 extending obliquely downwardly toward the first base portion BP1 from a top $G2_{tp}$ to a lower end portion $G2_{bt1}$; and a second portion G22 extending obliquely downwardly toward the second base portion BP2 from the top $G2_{tp}$ to a lower end portion $G2_{bt2}$.

An inside of the main portion MP is provided with a channel C1 linking the flow port P1 and the first concave groove G1, a channel C2 linking the flow port P2 and the second concave groove G2, a channel C3 linking the flow port P3 and the first concave groove G1, a channel C4 linking the flow port P4 and the second concave groove G2, a channel C5 linking the flow port P5 and the first concave groove G1, and a channel C6 linking the flow port P6 and the second concave groove G2.

The pair of channel blocks 42 are joined sandwiching an elastic sheet (unillustrated), in such a manner that surfaces MPi of the pair of channel blocks 42 face each other. A joined body of the pair of channel blocks 42 is fixed to a lower surface of the connection plate 41 via unillustrated sealing rubber. In this state, the flow ports P1, P2 of the channel block 42 on the far side of the paper surface of FIG. 9 respectively communicate with the second ink supply tube connecting portion ISC2 and second ink discharge tube connecting portion IDC2 via the holes H of the connection plate 41, and the flow ports P1, P2 of the channel block 42 positioned on the near side of the paper surface of FIG. 9 respectively communicate with the first ink supply tube connecting portion ISC1 and first ink discharge tube connecting portion IDC1 via the holes H of the connection plate 41.

The alignment frame 43 is a flat plate member made of SUS, for example. The alignment frame 43 has: a center through-hole $TH_{43}$ rectangular in planar view vertically penetrating a center portion of the alignment frame 43; and eight ink channels $IC_{43}$ circular in planar view provided in a periphery of the center through-hole $TH_{43}$.

The alignment frame 43 is fixed to lower surfaces of the pair of channel blocks 42. In this state, the flow ports P3-P6 on the lower surfaces of the pair of channel blocks 42 communicate with the ink channels $IC_{43}$ of the alignment frame 43.

The cooling frame 44 is a thick plate-like member rectangular in planar view, as depicted in FIG. 11. The cooling member 44 may be formed by a material having high thermal conductivity, such as aluminum, for example.

A coolant channel CC substantially U-shaped in planar view is formed inside the cooling frame 44. The coolant channel CC extends substantially in a U-shaped manner in planar view between a coolant supply port $CSP_{44}$ and a coolant discharge port $CDP_{44}$ in an upper surface of the cooling frame 44. In a periphery of the coolant channel CC, there are provided: eight ink channels $IC_{44}$ circular in planar view; and a center through-hole $TH_{44}$.

The cooling frame 44 is fixed to a lower surface of the alignment frame 43. In this state, each of the eight ink channels $IC_{43}$ of the alignment frame 43 communicate with each of the eight ink channels $IC_{44}$ of the cooling frame 44.

As depicted in FIG. 9, a coolant supply tube CST and a coolant discharge tube CDT are provided between the connection plate 41 and the cooling frame 44. An upper end of the coolant supply tube CST is provided with an O-ring (unillustrated). The coolant supply tube CST is connected to the connection plate 41 by having its upper end, along with the O-ring, inserted from a lower side into the hole H connected with the coolant supply tube connecting portion CSC of the connection plate 41. Moreover, a lower end portion of the coolant supply tube CST is connected to the coolant supply port $CSP_{44}$ of the cooling frame 44 via the center through-hole $TH_{43}$ of the alignment frame 43.

An upper end of the coolant discharge tube CDT is provided with an O-ring (unillustrated). The coolant discharge tube CDT is connected to the connection plate 41 by having its upper end, along with the O-ring, inserted from a lower side into the hole H connected with the coolant discharge tube connecting portion CDC of the connection plate 41. Moreover, a lower end portion of the coolant discharge tube CDT is connected to the coolant discharge port $CDP_{44}$ of the cooling frame 44 via the center through-hole $TH_{43}$ of the alignment frame 43.

The front-end frame 45 is a flat plate member made of SUS, for example. The front-end frame 45 has: a center through-hole $TH_{45}$ rectangular in planar view vertically penetrating a center portion of the front-end frame 45; and eight ink channels $IC_{45}$ rectangular in planar view provided in a periphery of the center through-hole $TH_{45}$.

The front-end frame 45 is fixed to a lower surface of the cooling frame 44. In this state, each of the eight ink channels $IC_{45}$ communicate with each of the eight ink channels $IC_{44}$ of the cooling frame 44.

Figure 12:
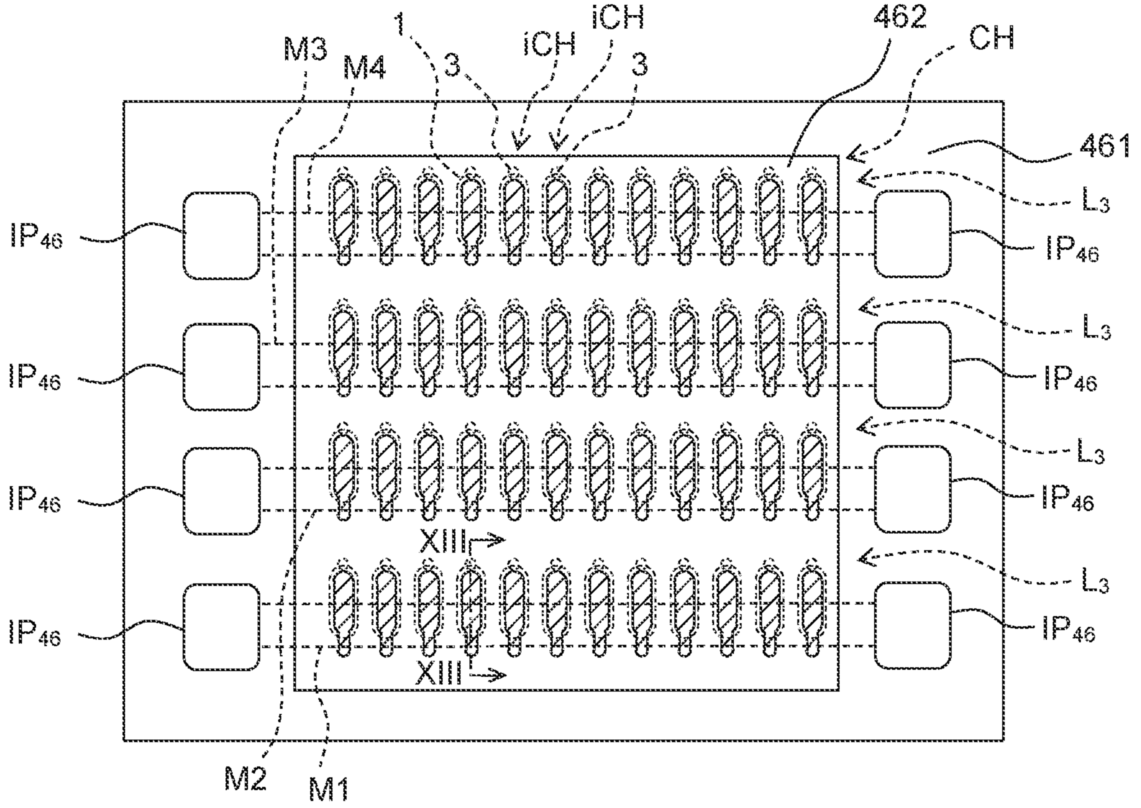
FIG. 12 is a plan view of a channel unit and an actuator.

The head 46 comprises: a channel unit 461; and a piezoelectric actuator 462 (FIGS. 11 and 12).

Figure 13:
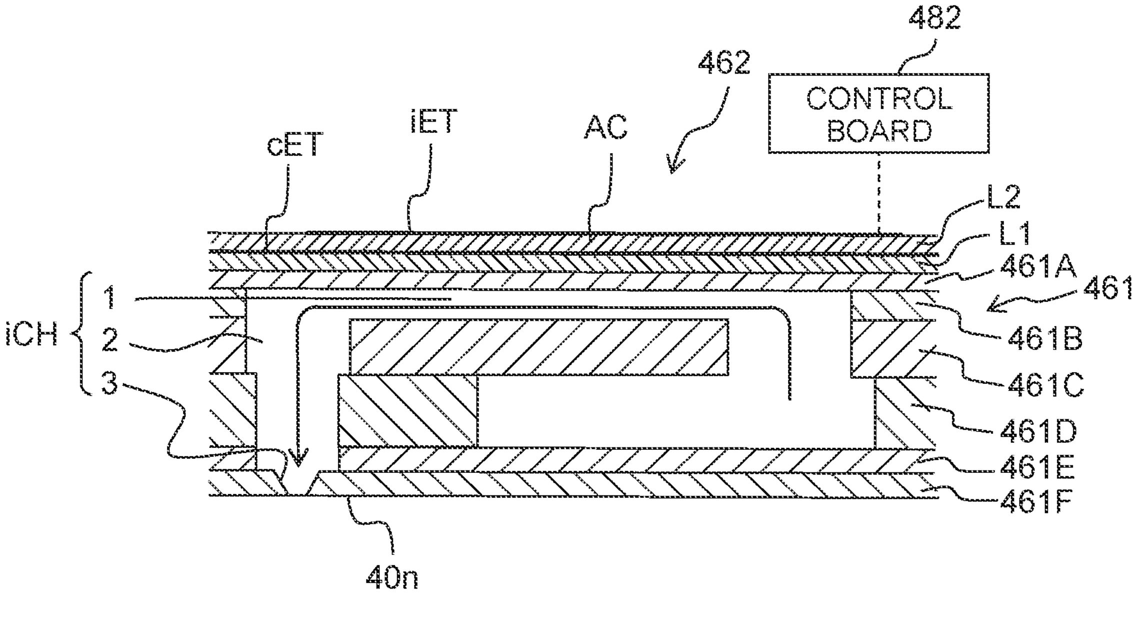
FIG. 13 is a cross-sectional view taken along the line XIII-XIII of FIG. 12.

As depicted in FIG. 13, the channel unit 461 is a laminated structure having laminated therein, in order from above, an ink sealing film 461A, plates 461B-461E, and a nozzle plate 461F. As depicted in FIG. 12, a channel CH is formed inside the channel unit 461.

The channel CH includes: eight ink flow ports $IP_{46}$; four manifold channels M1, M2, M3, M4; and forty-eight individual channels iCH. Each of the four manifold channels M1-M4 is a linear channel, and communicates at both ends thereof with the ink flow ports $IP_{46}$. Each of the four manifold channels M1-M4 is connected with twelve individual channels iCH.

As depicted in FIG. 13, each of the individual channels iCH includes a pressure chamber 1, a descender channel 2, and a nozzle 3. An upper surface of the pressure chamber 1 is formed by the ink sealing film 461A. The descender channel 2 extends in the up-down direction from the pressure chamber 1 to the nozzle 3. The nozzle 3, which is a minute opening discharging ink toward the medium PM, is formed in the nozzle plate 461F. A lower surface of the nozzle plate 461F, which is a lower surface of the head mechanism 40, is the nozzle surface 40*n*. A nozzle line (nozzle array) $L_3$ (FIG. 12) is formed in the nozzle surface 40*n* along a direction that the manifold channels M1-M4 extend.

As depicted in FIG. 13, the piezoelectric actuator 462 is configured by: a first piezoelectric layer L1 provided on an upper surface of the channel unit 461; a second piezoelectric layer L2 above the first piezoelectric layer L1; a common electrode cET sandwiched by the first piezoelectric layer L1 and second piezoelectric layer L2; and a plurality of individual electrodes iET provided on an upper surface of the second piezoelectric layer L2. The plurality of individual electrodes iET are provided on the upper surface of the second piezoelectric layer L2 so as to be respectively positioned above the pressure chambers 1 of the plurality of individual channels iCH. A portion sandwiched by the common electrode cET and each of the plurality of individual electrodes iET, of the second piezoelectric layer L2 becomes an active portion AC polarized in a thickness direction.

The head heater mechanism 47 applies heat to the head 46 to heat the ink flowing in the head 46. As depicted in FIG. 11, the head heater mechanism 47 has: a heat transfer member 471; a film heater 472; and a plate spring 473.

The heat transfer member 471 is formed by a metal of high thermal conductivity, for example, aluminum. As depicted in FIG. 11 (the portion in a box of FIG. 11 shows a lower surface perspective view of the heat transfer member 471) and FIG. 14, the heat transfer member 471 has: a plate portion 471A substantially square in planar view; a pair of wall portions 471B projecting upwardly from both end portions of an upper surface of the plate portion 471A; and a frame-like protruding portion 471C protruding downwardly from an outer edge of a lower surface of the plate portion 471A.

The heat transfer member 471 is fitted to an upper surface of the head 46 in such a manner that a lower end portion of the frame-like protruding portion 471C abuts on the channel unit 461 in a periphery (on an outer side) of the piezoelectric actuator 462. Note that a flexible printed circuit board (FPC) 481 of the discharge controller 48 is partially sandwiched between the frame-like protruding portion 471C and the channel unit 461 (this will be mentioned later).

The film heater 472 is substantially square in planar view. The film heater 472 is disposed on the heat transfer member 471 in such a manner that a heat generating surface of the film heater 472 abuts on the upper surface of the plate portion 471A of the heat transfer member 471. Heat generated by the film heater 472 is applied to the channel unit 461 via the heat transfer member 471.

The plate spring 473 is disposed on an upper surface of the film heater 472.

As depicted in FIGS. 11 and 14, the discharge controller 48 comprises: the FPC (Flexible Printed Circuit, flexible printed circuit board) 481; and a control board 482 mounted with a driver IC. Illustration of the FPC 481 is omitted in FIG. 11.

The FPC 481 is belt-like, and, in its center portion 481A in a longitudinal direction, has formed a plurality of contacts (unillustrated).

The control board 482 is disposed parallel to the plate portion 471A of the heat transfer member 471, above the plate spring 473 of the head heater mechanism 47. The control board 482 abuts on the cooling frame 44, while at the same time being separated from the film heater 472 by the plate spring 473. Moreover, radiant heat of the film heater 472 is blocked by the plate spring 473, and heating of the control board 482 is suppressed.

As depicted in FIG. 14, the FPC 481 is disposed on an upper surface of the piezoelectric actuator 462 in such a manner that each of the plurality of contacts of its center portion 481A are electrically connected to each of the plurality of individual electrodes iET of the piezoelectric actuator 462. A portion to an outer side of the center portion 481A of the FPC 481 passes between the heat transfer member 471 of the head heater mechanism 47 and the head 46, and extends upwardly along a side surface of the heat transfer member 471 to be connected to the control board 482. As a result, each of the plurality of individual electrodes iET of the piezoelectric actuator 462 is connected to the control board 482 via the FPC 481.

The head 46 is fixed to the front-end frame 45. In this state, each of the eight ink flow ports $IP_{46}$ communicate with each of the eight ink channels $IC_{45}$ of the front-end frame 45. The piezoelectric actuator 462, the head heater mechanism 47, and the discharge controller 48 are disposed inside the center through-hole $TH_{45}$ of the front-end frame 45.

As depicted in FIG. 14, in a vicinity of a region in contact with the heat transfer member 471, of an upper surface of the channel unit 461, there is provided a temperature measuring device $TM_{40}$. The temperature measuring device $TM_{40}$ is a thermistor, for example. Note that illustration of the temperature measuring device $TM_{40}$ is omitted in FIG. 11.

The temperature measuring device $TM_{40}$ measures a temperature of ink flowing along the channel CH in the channel unit 461. The temperature of ink that has been measured by the temperature measuring device $TM_{40}$ is sent to the controller 600 via the relay board 70 (mentioned later).

The wiring connection portion WC, which is circuit board-like, extends vertically as depicted in FIG. 14. An upper end portion of the wiring connection portion WC is disposed at a position above the connection plate 41 and adjacent to the connection plate 41. A lower end portion of the wiring connection portion WC is positioned inside the center through-hole $TH_{45}$ of the front-end frame 45. The wiring connection portion WC penetrates the center through-hole $TH_{43}$ of the alignment frame 43 and the center through-hole $TH_{44}$ of the cooling frame 44 in the up-down direction.

An upper end of the wiring connection portion WC is connected with a flexible board 71 extending from the relay board 70 (mentioned later). A lower end of the wiring connection portion WC is connected with: the film heater 472 of the head heater mechanism 47; and the control board 482 of the discharge controller 48.

Each of the head mechanisms 40 is fixed to the bottom portion 11*b* of the first portion 11 of the casing 10, via the alignment frame 43. In this state, the nozzle surface 40*n* of each head mechanism 40 is exposed toward a lower side of the casing 10. Moreover, the nozzle line $L_3$ of the nozzle surface 40*n* extends along the width direction of the head system 100.

Figure 15:
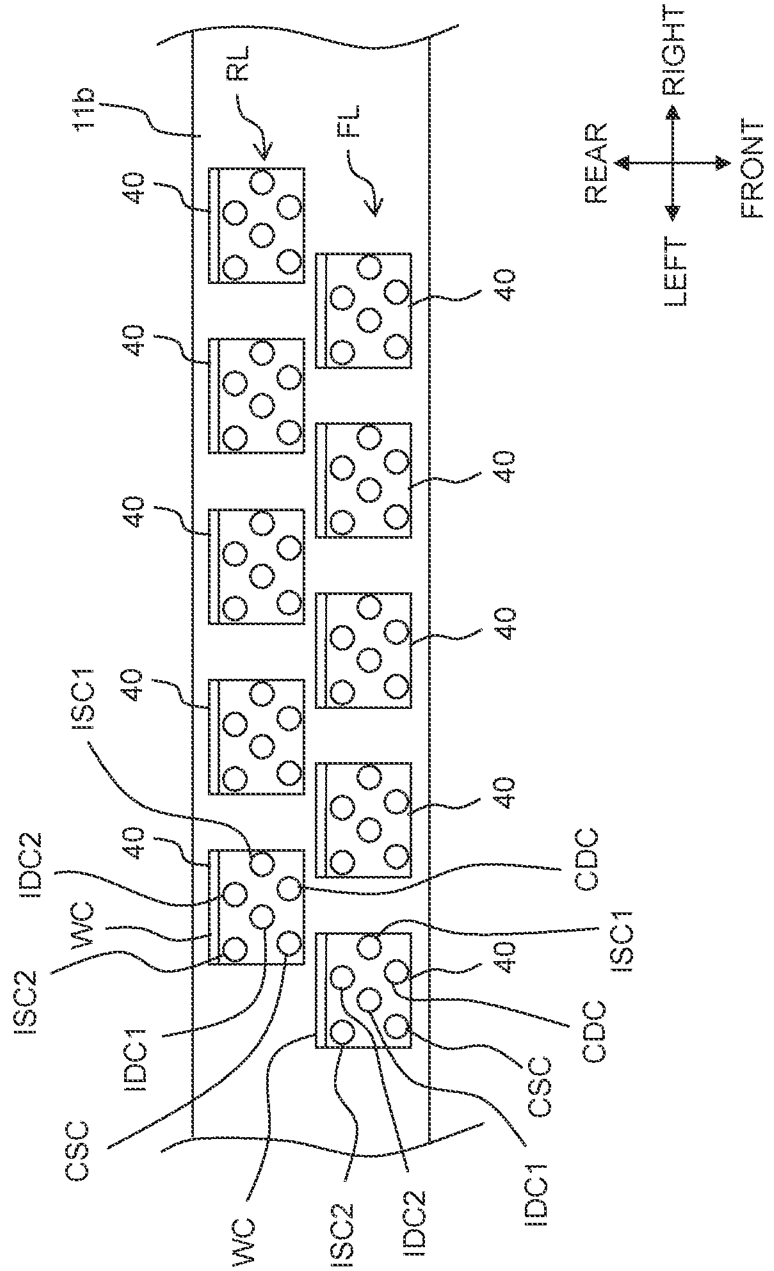
FIG. 15 is a plan view depicting disposition of the ten head mechanisms in a bottom portion of the casing.

As depicted in FIG. 15, the bottom portion 11*b* of the first portion 11 of the casing 10 has the ten head mechanisms 40 disposed staggered (in a zigzag manner) therein along the width direction. Each of the ten head mechanisms 40 is provided in such a manner that the coolant supply tube connecting portion CSC and coolant discharge tube connecting portion CDC are positioned on its front side, and the wiring connection portion WC is positioned on its rear side.

Five of the head mechanisms 40 are disposed at equal intervals along the width direction of the head system 100, on a front side of the bottom portion 11*b*. A line of head mechanisms 40 on the front side of the bottom portion 11*b* will appropriately be called a front line FL. The remaining five head mechanisms 40 are disposed at equal intervals along the width direction of the head system 100, on a rear side of the front line FL. A line of head mechanisms 40 on the rear side of the front line FL will appropriately be called a rear line RL.

Disposition of the first and second ink supply tube connecting portions ISC1, ISC2, the first and second ink discharge tube connecting portions IDC1, IDC2, the coolant supply tube connecting portion CSC, and the coolant discharge tube connecting portion CDC (appropriately collectively called a "connecting portion set") in each head mechanism 40 is as follows.

The coolant supply tube connecting portion CSC and the coolant discharge tube connecting portion CDC are in the same position in the front-rear direction, and aligned in the width direction. The coolant supply tube connecting portion CSC is positioned on a left side of the coolant discharge tube connecting portion CDC.

The first ink supply tube connecting portion ISC1 and the first ink discharge tube connecting portion IDC1 are positioned rearward of the coolant supply tube connecting portion CSC and the coolant discharge tube connecting portion CDC. The first ink supply tube connecting portion ISC1 and the first ink discharge tube connecting portion IDC1 are in the same position in the front-rear direction, and aligned in the width direction. The first ink supply tube connecting portion ISC1 is positioned on a right side of the first ink discharge tube connecting portion IDC1.

The second ink supply tube connecting portion ISC2 and the second ink discharge tube connecting portion IDC2 are positioned rearward of the first ink supply tube connecting portion ISC1 and the first ink discharge tube connecting portion IDC1. The second ink supply tube connecting portion ISC2 and the second ink discharge tube connecting portion IDC2 are in the same position in the front-rear direction, and aligned in the width direction. The second ink supply tube connecting portion ISC2 is positioned on a left side of the second ink discharge tube connecting portion IDC2.

In the width direction, the first ink discharge tube connecting portion IDC1 is positioned between the coolant supply tube connecting portion CSC and the coolant discharge tube connecting portion CDC, and the coolant discharge tube connecting portion CDC is positioned between the first ink supply tube connecting portion ISC1 and the first ink discharge tube connecting portion IDC1. As a result, the coolant supply tube connecting portion CSC, the first ink discharge tube connecting portion IDC1, the coolant discharge tube connecting portion CDC, and the first ink supply tube connecting portion ISC1 are aligned staggered (in a zigzag manner) in this order from left to right along the width direction of the head system 100.

In the width direction, the first ink discharge tube connecting portion IDC1 is positioned between the second ink supply tube connecting portion ISC2 and the second ink discharge tube connecting portion IDC2, and the second ink discharge tube connecting portion IDC2 is positioned between the first ink supply tube connecting portion ISC1 and the first ink discharge tube connecting portion IDC1. As a result, the second ink supply tube connecting portion ISC2, the first ink discharge tube connecting portion IDC1, the second ink discharge tube connecting portion IDC2, and the first ink supply tube connecting portion ISC1 are aligned staggered (in a zigzag manner) in this order from left to right along the width direction of the head system 100.

In the width direction, the second ink discharge tube connecting portion IDC2 is positioned between the coolant supply tube connecting portion CSC and the coolant discharge tube connecting portion CDC, and the coolant supply tube connecting portion CSC is positioned between the second ink supply tube connecting portion ISC2 and the second ink discharge tube connecting portion IDC2. That is, the second ink supply tube connecting portion ISC2, the coolant supply tube connecting portion CSC, the second ink discharge tube connecting portion IDC2, and the coolant discharge tube connecting portion CDC are aligned staggered (in a zigzag manner) in this order from left to right along the width direction of the head system 100.

In the width direction, the first and second ink supply tube connecting portions ISC1, ISC2, the first and second ink discharge tube connecting portions IDC1, IDC2, the coolant supply tube connecting portion CSC, and the coolant discharge tube connecting portion CDC are in different positions from each other.

Moreover, the coolant supply tube connecting portion CSC, the first ink discharge tube connecting portion IDC1, and the second ink supply tube connecting portion ISC2 are aligned staggered (in a zigzag manner) in this order from front to rear along the front-rear direction. The coolant discharge tube connecting portion CDC, the first ink supply tube connecting portion ISC1, and the second ink discharge tube connecting portion IDC2 are aligned staggered (in a zigzag manner) in this order from front to rear along the front-rear direction.

Note that in the present embodiment, "in the width direction, a certain connecting portion being in a different position from another connecting portion" may refer to either of a state where, in the width direction, at least part of the certain connecting portion is in a different position from the other connecting portion and a state where, in the width direction, the whole of the certain connecting portion is in a different position from the other connecting portion. Moreover, "in the width direction, a certain connecting portion being positioned between another two connecting portions" may refer to either of a state where a center portion in the width direction of the certain connecting portion is positioned between center portions in the width direction of each of the other two connecting portions and a state where an entire region in the width direction of the certain connecting portion is positioned between the other two connecting portions without overlapping either of the other two connecting portions.

Now, disposition of the ten head mechanisms 40 in the bottom portion 11*b* (FIG. 15) corresponds to disposition of the ten ink flow port sets S in the bottom plate 33 of the sub-tank 30 (FIGS. 6 and 7). That is, the ten head mechanisms 40 are respectively positioned directly below the ten ink flow port sets S.

Between one of the ten ink flow port sets S and the head mechanism 40 positioned directly below it, in planar view, the first ink supply port SP1 and first ink supply tube connecting portion ISC1 are in the same position as each other, the second ink supply port SP2 and second ink supply tube connecting portion ISC2 are in the same position as each other, the first ink discharge port DP1 and first ink discharge tube connecting portion IDC1 are in the same position as each other, and the second ink discharge port DP2 and second ink discharge tube connecting portion IDC2 are in the same position as each other. That is, in planar view, a center of each supply port or discharge port and a center of a channel defined within each connecting portion coincide with each other.

<Ink Channel between Sub-Tank 30 and Head Mechanism 40>

Figure 19:
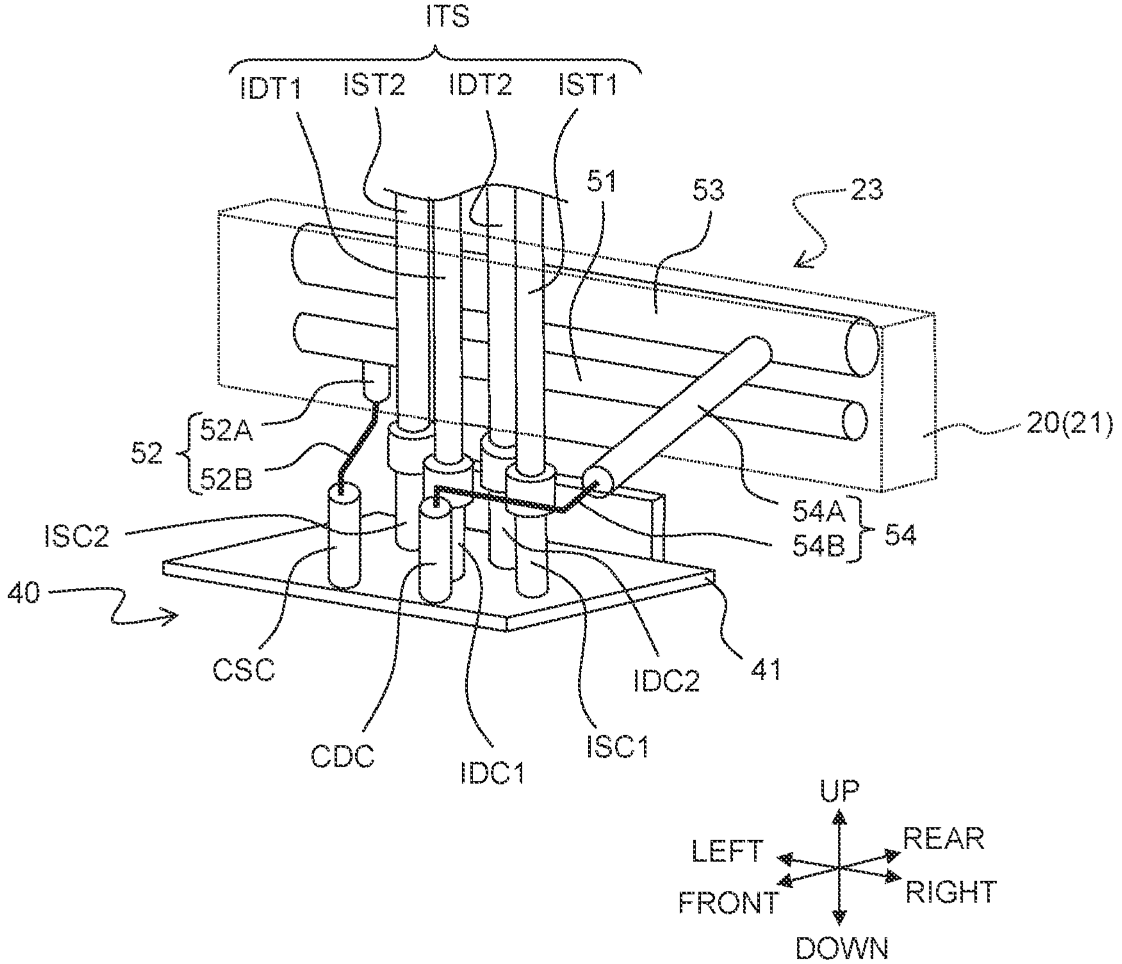
FIG. 19 is a perspective view depicting disposition of the preheating channel, the ink tube set, and the coolant circulation mechanism above the head mechanism. Regarding a channel block 21 of a preheating channel 20 and a coolant supply manifold 51 and coolant discharge manifold 53 of the coolant circulation mechanism, only portions in a left-right direction thereof are depicted. The preheating channel 20 is depicted as a transparent configuration by dotted lines, in order to allow visual observation of a structure positioned on its far side.

As depicted in FIG. 2, each of the head mechanisms 40 is connected to the sub-tank 30 by the ink tube set ITS. Although the ink tube set ITS is illustrated by a single line in FIG. 2, it includes four ducts (conduits, tubes, pipes), that is, a first ink supply tube IST1, a second ink supply tube IST2, a first ink discharge tube IDT1, and a second ink discharge tube IDT2 (FIG. 19).

Figure 16:
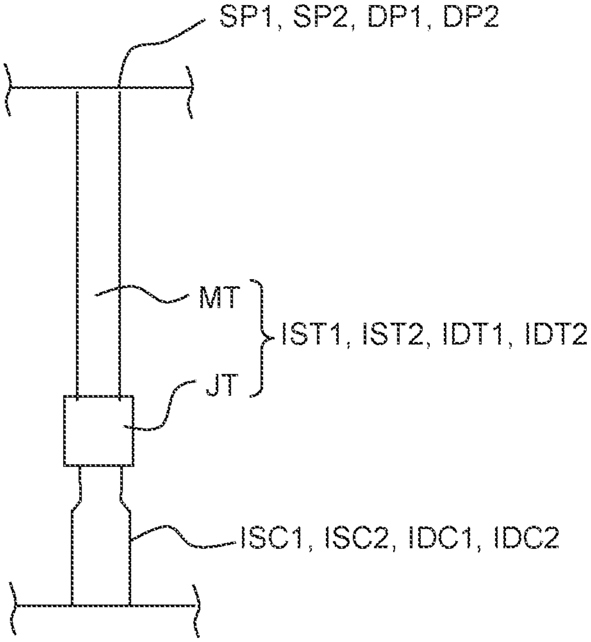
FIG. 16 is a side view of each of ink tubes included in an ink tube set.

As depicted in FIG. 16, the first ink supply tube IST1, the second ink supply tube IST2, the first ink discharge tube IDT1, and the second ink discharge tube IDT2 have the same shape as each other, and each have: a main portion MT extending linearly in the up-down direction; and a joint portion JT provided in a lower end portion of the main portion MT.

The main portion MT is a circular tube formed by a resin or metal. The joint portion JT is a one-touch joint in the present embodiment. An outer diameter of the joint portion JT is larger than an outer diameter of the main portion MT. The joint portion JT is one example of a "large-diameter portion" of the present invention, and the main portion MT is one example of a "small-diameter portion" of the present invention.

Between each of the head mechanisms 40 and the ink flow port set S of the sub-tank 30 positioned directly above the head mechanism 40, an upper end of the first ink supply tube IST1 is connected to the first ink supply port SP1, and the joint portion JT of the first ink supply tube IST1 is connected to the first ink supply tube connecting portion ISC1. An upper end of the second ink supply tube IST2 is connected to the second ink supply port SP2, and the joint portion JT of the second ink supply tube IST2 is connected to the second ink supply tube connecting portion ISC2. An upper end of the first ink discharge tube IDT1 is connected to the first ink discharge port DP1, and the joint portion JT of the first ink discharge tube IDT1 is connected to the first ink discharge tube connecting portion IDC1. An upper end of the second ink discharge tube IDT2 is connected to the second ink discharge port DP2, and the joint portion JT of the second ink discharge tube IDT2 is connected to the second ink discharge tube connecting portion IDC2.

As a result, the first ink supply tube IST1, the second ink supply tube IST2, the first ink discharge tube IDT1, and the second ink discharge tube IDT2 extend linearly in the up-down direction in an entire region between the sub-tank 30 and the plurality of head mechanisms 40, below the sub-tank 30 and above the head mechanisms 40, to connect the sub-tank 30 and each of the plurality of head mechanisms 40.

Figure 18:
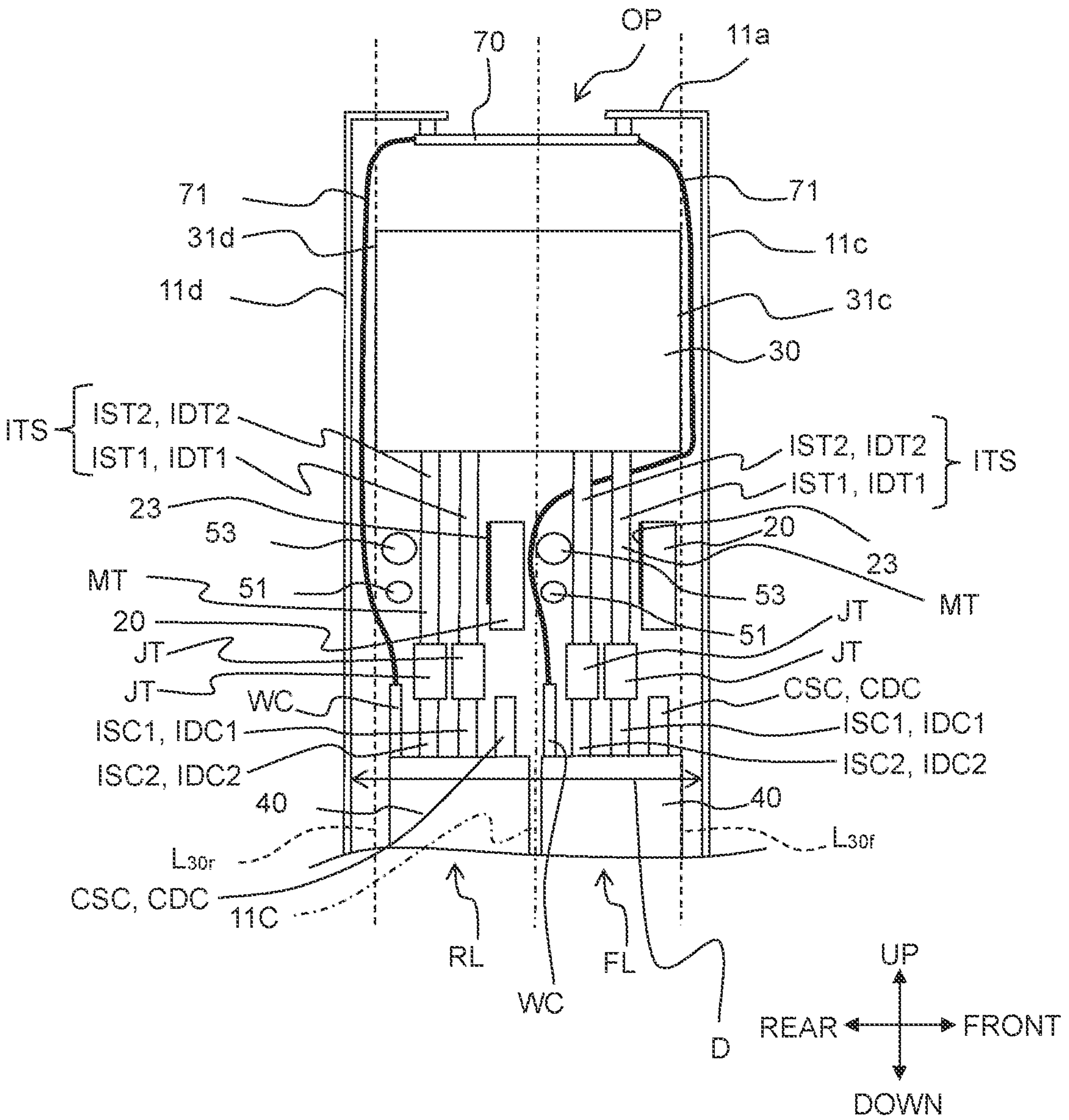
FIG. 18 is an explanatory diagram depicting disposition in a front-rear direction of a configuration within the casing.

Note that, as depicted in FIGS. 18 and 19, the channel block 21 of the preheating channel 20 is disposed in the vicinity of the ink tube set ITS. Hence, the ink tube set ITS is warmed by heat radiated from the radiation sheet 23 affixed to the channel block 21, and temperature drop of ink flowing along an inside of the ink tube set ITS is suppressed.

As depicted in FIG. 18, for each head mechanism 40, the preheating channel 20 directly above said head mechanism 40 is disposed forward of the first ink supply tube IST1 and first ink discharge tube IDT1 connected to said head mechanism 40, in such a manner that the radiation sheet 23 affixed to the channel block 21 faces outer peripheral surfaces of the first ink supply tube IST1 and first ink discharge tube IDT1. Specifically, the preheating channel 20 is disposed such that a lower end portion of the channel block 21 is positioned above upper ends of the joint portions JT of the first ink supply tube IST1 and first ink discharge tube IDT1, that is, such that an entire region of the channel block 21 in the up-down direction faces the main portions MT of the first ink supply tube IST1 and first ink discharge tube IDT1. By making different in the up-down direction a position of the joint portion JT whose outer diameter is larger than that of the main portion MT and a position of the channel block 21, a gap between the radiation sheet 23 and the main portions MT of the first ink supply tube IST1 and first ink discharge tube IDT1 can be reduced. Hence, the preheating channel 20 and the ink tube sets ITS can be compactly disposed in the front-rear direction, and heat radiated from the radiation sheet 23 of the preheating channel 20 can be efficiently applied to ink flowing through the ink tube sets ITS.

<Coolant Circulation Mechanism 50, Chiller 60>

The coolant circulation mechanism 50 performs supply of coolant (for example, water) to the ten head mechanisms 40 and discharge of coolant from the ten head mechanisms 40.

As depicted in FIG. 2, the coolant circulation mechanism 50 is disposed below the sub-tank 30 and above the plurality of head mechanisms 40 inside the first portion 11 of the casing 10.

Figure 17:
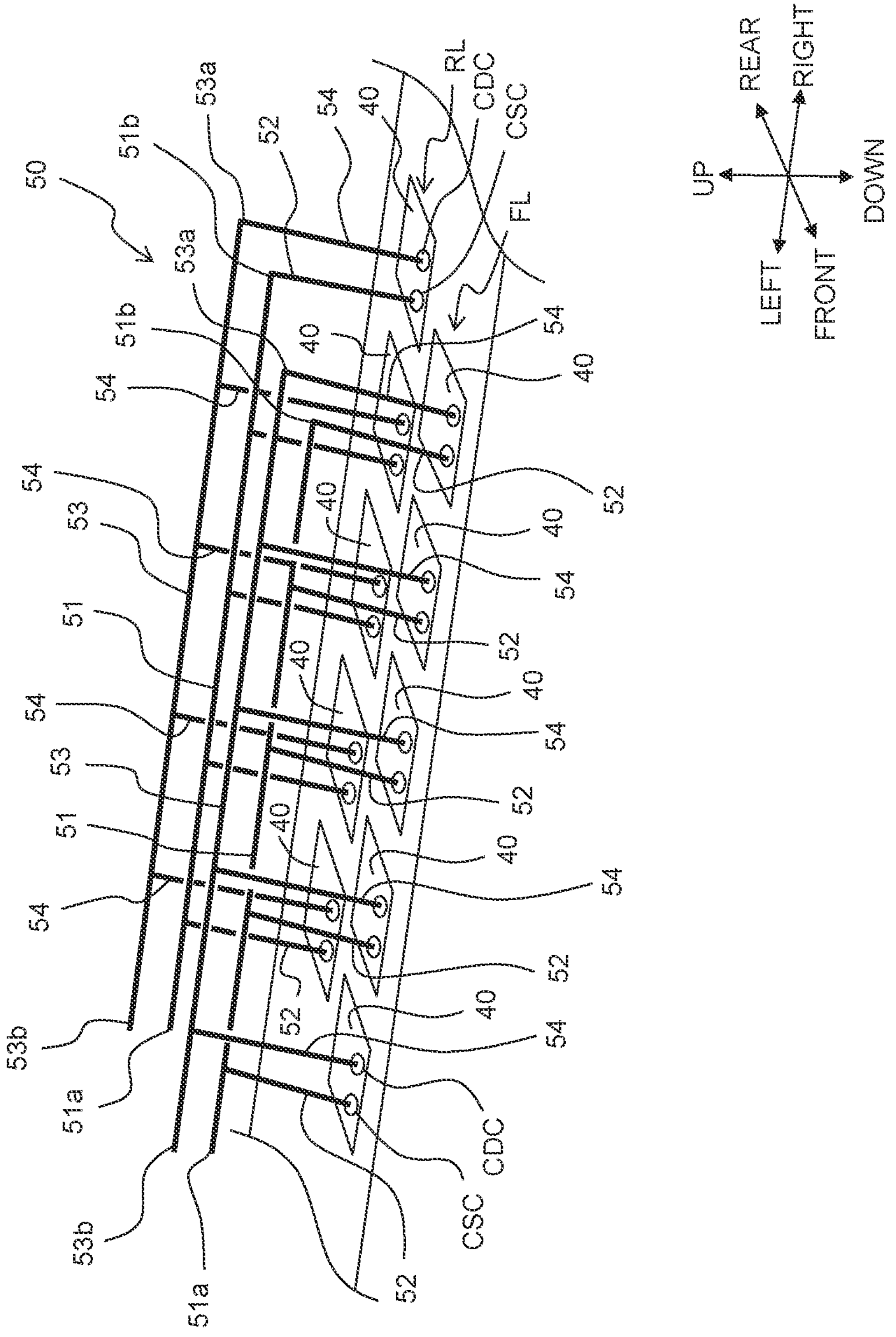
FIG. 17 is a schematic perspective view of a coolant circulation mechanism.

As depicted in FIG. 17, the coolant circulation mechanism 50 mainly comprises: two coolant supply manifolds 51 and ten coolant supply tubes 52 connected to the two coolant supply manifolds 51; and two coolant discharge manifolds 53 and ten coolant discharge tubes 54 connected to the two coolant discharge manifolds 53.

The two coolant supply manifolds 51 are each a linear circular tube extending in the width direction of the head system 100, and each have a coolant channel defined on their inside. The coolant supply manifold 51 may be formed by stainless steel, for example.

Upstream ends 51*a* of the two coolant supply manifolds 51 are each connected to the coolant supply port $CSP_{10}$ of the first portion 11 of the casing 10 by unillustrated ducts. A downstream end 51*b* of the coolant supply manifold 51 is closed.

One of the two coolant supply manifolds 51 is positioned above the five head mechanisms 40 included in the front line FL, of the ten head mechanisms 40. More specifically, as depicted in FIG. 18, it is positioned rearward of the ink tube sets ITS connected to the head mechanisms 40 included in the front line FL, and directly above the wiring connection portions WC of the head mechanisms 40 included in the front line FL.

The other of the two coolant supply manifolds 51 is positioned above the head mechanisms 40 included in the rear line RL, of the ten head mechanisms 40. More specifically, as depicted in FIG. 18, it is positioned rearward of the ink tube sets ITS connected to the head mechanisms 40 included in the rear line RL, and directly above the wiring connection portions WC of the five head mechanisms 40 included in the rear line RL.

The coolant supply tube 52 is a duct connecting the coolant supply manifold 51 and the coolant supply tube connecting portion CSC of the head mechanism 40. Five each of the coolant supply tubes 52 are connected at equal intervals to each of the two coolant supply manifolds 51.

As depicted in FIG. 19, each of the coolant supply tubes 52 includes: a linear portion 52A extending directly downwards from the coolant supply manifold 51; and a bending joint portion 52B linking the linear portion 52A and the coolant supply tube connecting portion CSC. The bending joint portion 52B extends in a front right direction in a plane orthogonal to the up-down direction from a lower end of the linear portion 52A to the coolant supply tube connecting portion CSC.

Figure 20:
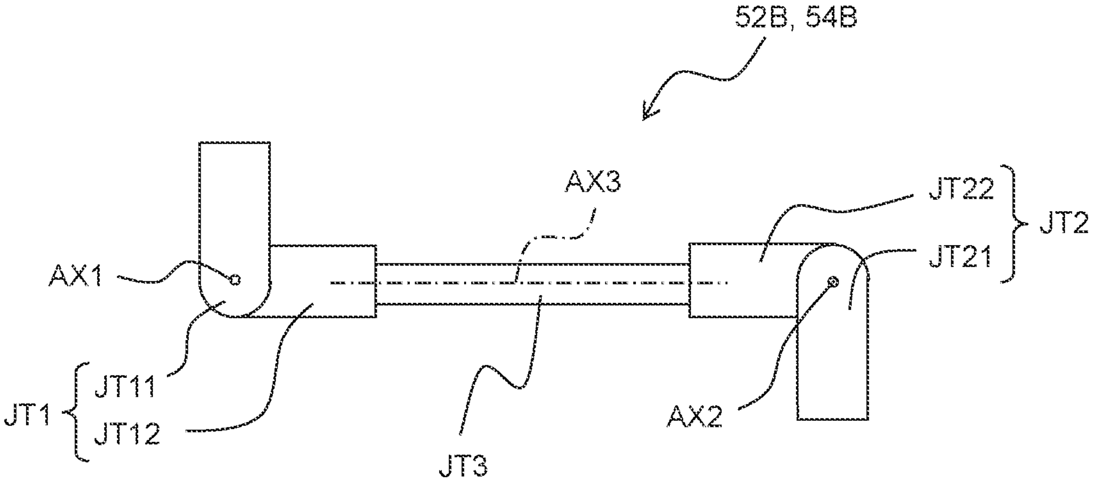
FIG. 20 is a side view of a bending joint portion.

As depicted in FIG. 20, the bending joint portion 52B includes: two angle-variable joints JT1, JT2; and a coupling tube JT3.

The angle-variable joint JT1 includes a first portion JT11 and a second portion JT12, each having a channel defined on its inside. The first portion JT11 and the second portion JT12 are coupled via a pivotal axis AX1. The angle-variable joint JT2 includes a first portion JT21 and a second portion JT22, each having a channel defined on its inside. The first portion JT21 and the second portion JT22 are coupled via a pivotal axis AX2. The first portion JT21 is a one-touch joint. The coupling tube JT3, which is a circular tube having a central axis AX3, has its one end inserted in the second portion JT12 of the angle-variable joint JT1, and has its other end inserted in the second portion JT22 of the angle-variable joint JT2.

The first portion JT11 of the angle-variable joint JT1 is fitted to the lower end of the linear portion 52A, and the first portion JT21 of the angle-variable joint JT2 is fitted to the coolant supply tube connecting portion CSC of the head mechanism 40.

The bending joint portion 52B enables the first portion JT11 of the angle-variable joint JT1 to be pivotally moved with respect to the second portion JT12 around the pivotal axis AX1 to change an angle between an extension direction of the channel in the first portion JT11 and an extension direction of the channel in the second portion JT12, and enables the first portion JT21 of the angle-variable joint JT2 to be pivotally moved with respect to the second portion JT22 around the pivotal axis AX2 to change an angle between an extension direction of the channel in the first portion JT21 and an extension direction of the channel in the second portion JT22. Furthermore, the angle-variable joints JT1, JT2 can be rotated around the central axis AX3 of the coupling tube JT3. Therefore, work to connect the linear portion 52A and the coolant supply tube connecting portion CSC can be performed easily in a limited space, while a positional relationship of the first portion JT11 and first portion JT21 is flexibly adjusted.

The two coolant discharge manifolds 53 are each a linear circular tube extending in the width direction of the head system 100, and each have a coolant channel defined on their inside. A tube diameter of the coolant discharge manifold 53 may be larger than a tube diameter of the coolant supply manifold 51, and a diameter of the coolant channel define in the coolant discharge manifold 53 may be larger than a diameter of the coolant channel defined in the coolant supply manifold 51. The coolant discharge manifold 53 may be formed by stainless steel, for example.

Upstream ends 53*a* of the two coolant discharge manifolds 53 are closed. Downstream ends 53*b* of the two coolant discharge manifolds 53 are each connected to the coolant discharge port $CDP_{10}$ of the first portion 11 of the casing 10 by unillustrated ducts.

As depicted in FIG. 18, one of the two coolant discharge manifolds 53 is positioned directly above the coolant supply manifold 51 connected to the head mechanisms 40 included in the front line FL, to extend parallel to said coolant supply manifold 51. The other of the two coolant discharge manifolds 53 is positioned directly above the coolant supply manifold 51 connected to the head mechanisms 40 included in the rear line RL, to extend parallel to said coolant supply manifold 51.

The coolant discharge tube 54 is a duct connecting the coolant discharge manifold 53 and the coolant discharge tube connecting portion CDC of the head mechanism 40. Five each of the coolant discharge tubes 54 are connected at equal intervals to each of the two coolant discharge manifolds 53.

As depicted in FIG. 19, each of the coolant discharge tubes 54 includes: a linear portion 54A extending forwardly and downwardly from the coolant discharge manifold 53; and a bending joint portion 54B linking the linear portion 54A and the coolant discharge tube connecting portion CDC. A channel length of the coolant channel defined by the linear portion 54A is larger than a channel length of the coolant channel defined by the linear portion 52A of the coolant supply tube 52. A channel length of the coolant channel defined by the bending joint portion 54B is the same as a channel length of the coolant channel defined by the bending joint portion 52B of the coolant supply tube 52.

The bending joint portion 54B extends leftwards in a plane orthogonal to the up-down direction from a lower end of the linear portion 54A to the coolant discharge tube connecting portion CDC.

As depicted in FIG. 20, the bending joint portion 54B has the same structure as the bending joint portion 52B. The first portion JT11 of the angle-variable joint JT1 is fitted to a lower end of the linear portion 54A, and the first portion JT21 of the angle-variable joint JT2 is fitted to the coolant discharge tube connecting portion CDC of the head mechanism 40.

The coolant circulation mechanism 50 and the cooling frame 44, coolant supply tube CST, and coolant discharge tube CDT of the head mechanism 40 configure the chiller (cooling mechanism) 60 that cools the control board 482 of the discharge controller 48. The chiller 60 cools by coolant the cooling frame 44 on which the control board 482 is abutted, and thereby cools the control board 482.

Flow of coolant in the chiller 60 is as follows.

Coolant that has been supplied to the coolant supply port $CSP_{10}$ of the casing 10 from a coolant tank (unillustrated) passes along the coolant supply manifold 51 and coolant supply tube 52 to be supplied to each head mechanism 40, and reaches the coolant channel CC via the coolant supply tube CST. Coolant that has been warmed by heat exchange with the control board 482 in the coolant channel CC passes along the coolant discharge tube CDT and coolant discharge tube 54 to reach the coolant discharge manifold 53, and passes through the coolant discharge port $CDP_{10}$ of the casing 10 to be returned to the coolant tank (unillustrated).

Note that in the present invention, the "chiller" is assumed not to include the likes of ducts or the coolant tank provided outside the head system 100.

<Relay Board 70>

The relay board 70 mainly performs relay between the control board unit 80 and the discharge controller 48 of the head mechanism 40. The relay board 70 additionally distributes to the control board unit 80, the discharge controller 48, and each heater in the casing 10 electric power that has been supplied from the electrical connector CN of the casing 10.

As depicted in FIGS. 2 and 18, the relay board 70 is fitted, parallel to the top plate 11*a*, to a lower surface on a right end side of the top plate 11*a*. That is, a mounting surface (a surface of the board on which circuit elements are boarded) of the relay board 70 is parallel to upper and lower surfaces of the top plate 11*a*, and parallel to a plane including the width direction and the front-rear direction.

The relay board 70 is disposed above the sub-tank 30 so as to be contained within a plane-of-projection (projection plane) in the up-down direction of the sub-tank 30 in the front-rear direction. As a result, a front end of the relay board 70 is positioned at the rear side of (further to the rear than) a front end of the sub-tank 30, and a rear end of the relay board 70 is positioned at the front side of (further to the front than) a rear end of the sub-tank 30.

A region positioned above the relay board 70 of the top plate 11*a* is provided with a rectangular opening OP long in the width direction of the head system 100.

As depicted in FIG. 18, the relay board 70 is connected by the flexible board 71 to each of the ten head mechanisms 40. The flexible board 71 is provided with the likes of a wiring linking the control board unit 80 and discharge controller 48, a wiring linking the control board unit 80 and temperature measuring device $TM_{40}$, and a wiring supplying electric power to the head heater mechanism 47 and discharge controller 48.

The flexible boards 71 are provided one each to each of the ten head mechanisms 40. One end of the flexible board 71 is connected to the wiring connection portion WC of the head mechanism 40, and the other end of the flexible board 71 is connected to the relay board 70.

The flexible board 71 connected to the wiring connection portion WC of a head mechanism 40 of the front line FL extends upwardly passing between the coolant supply manifold 51 and coolant discharge manifold 53 connected to the head mechanisms 40 of the front line FL and the preheating channel 20 positioned above the head mechanisms 40 of the rear line RL. The flexible board 71 subsequently extends forwardly passing through a gap between the ink tube set ITS connected to the head mechanism 40 connected with said flexible board 71 and the ink tube set ITS connected to a head mechanism 40 adjacent in the width direction to said head mechanism 40, and further extends upwardly passing through a gap between the front wall 31*c* of the sub-tank 30 and the front wall 11*c* of the first portion 11 of the casing 10, to reach the relay board 70.

The flexible board 71 may be folded in two along an extension direction between the wiring connection portion WC and the relay board 70. As a result, the flexible board 71 can be more compactly disposed, and the flexible board 71 can be disposed even if the gap between two ink tube sets ITS adjacent to each other in the width direction is small.

The flexible board 71 connected to the wiring connection portion WC of a head mechanism 40 of the rear line RL extends upwardly passing through a gap between the coolant supply manifold 51 and coolant discharge manifold 53 connected to the head mechanisms 40 of the rear line RL and the rear wall 11*d* of the first portion 11 of the casing 10 and a gap between the rear wall 31*d* of the sub-tank 30 and the rear wall 11*d*, to reach the relay board 70.

Thus, by the relay board 70 being disposed above the sub-tank 30 so as to be contained within the plane-of-projection in the up-down direction of the sub-tank 30 in the front-rear direction, and by the relay board 70 and head mechanism 40 being connected by the flexible board 71 passing through the gap between the sub-tank 30 and the front wall 11*c* or rear wall 11*d* of the first portion 11, the relay board 70 and the flexible board 71 can be disposed without an accompanying increase in dimension in the front-rear direction of the casing 10.

The relay board 70 is connected to the electrical connector CN of the left wall 11*e* of the first portion 11, the heater module 22 of the preheating channel 20, and the sub-tank heater 34 of the sub-tank 30, by unillustrated wirings.

The relay board 70 is connected to the temperature measuring device $TM_{20}$ of the preheating channel 20 by an unillustrated wiring. The relay board 70 additionally is connected to the temperature measuring devices $TM_{30}$ of the sub-tank 30 by unillustrated wirings.

<Control Board Unit 80>

The control board unit 80 receives a print data signal from the controller 600 of the printer 1000, and sends the print data signal to the discharge controller 48 of each head mechanism 40 via the relay board 70. Moreover, the control board unit 80 sends information, and so on, from the temperature measuring devices $TM_{20}$, $TM_{30}$, $TM_{40}$ received from the relay board 70 to the controller 600. The control board unit 80 is provided inside the second portion 12 of the casing 10 (FIG. 2).

A terminal (unillustrated) of the control board unit 80 projects downwardly, via an opening (unillustrated) provided in the bottom plate 12*b* of the second portion 12. Attachment/Detachment to/from the first portion 11 of the second portion 12 is performed by the terminal being attached/detached to/from a connector (unillustrated) of the relay board 70 via the opening OP provided in the top plate 11*a* of the first portion 11.

<Flow of Ink>

Figure 21:
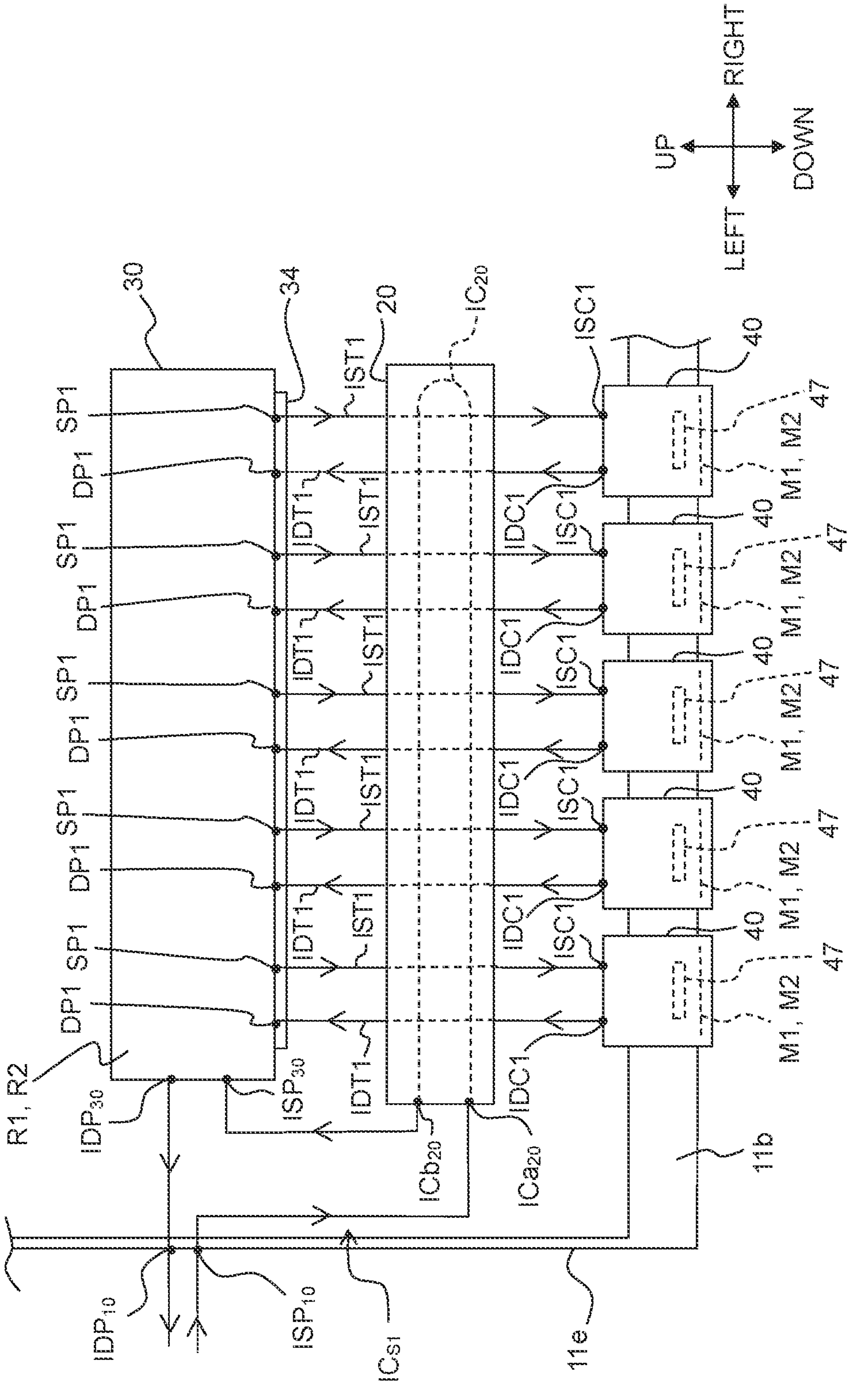
FIG. 21 is a schematic view of a channel of a first ink in the head system.
Figure 22:
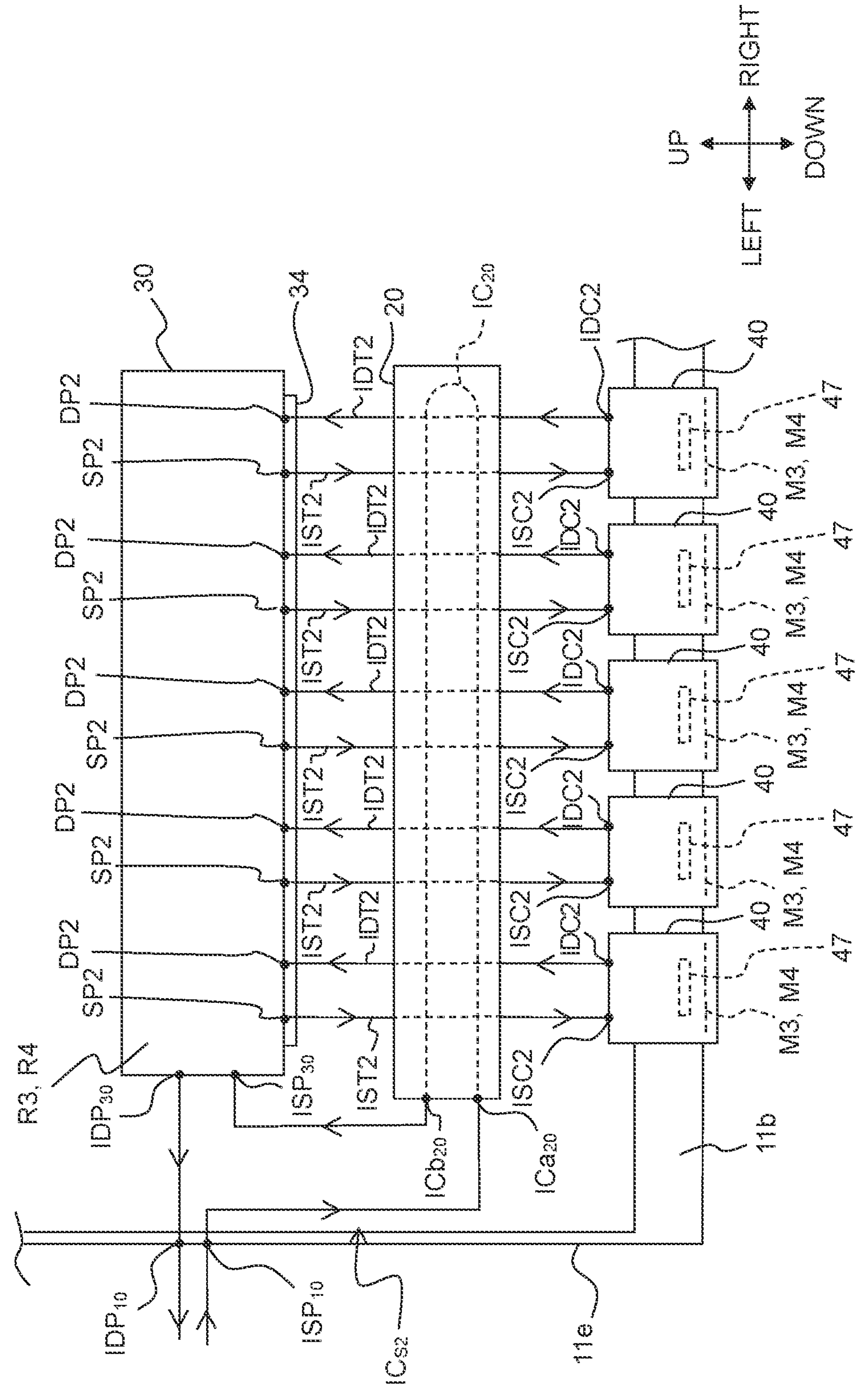
FIG. 22 is a schematic view of a channel of a second ink in the head system.

Now, flow of ink in the head system 100 will be outlined with reference to FIGS. 21 and 22. In the head system 10, a maximum of two kinds of inks can be simultaneously let flow.

As depicted in FIG. 21, a first ink that has been supplied to the ink supply port $ISP_{10}$ on the front side, of the two ink supply ports $ISP_{10}$ of the casing 10, from the reservoir 500 flows into the upstream end $ICa_{20}$ of the ink channel $IC_{20}$ of the preheating channel 20 on the front side via a duct, and, after having had its temperature raised in the ink channel $IC_{20}$, flows out from the downstream end $ICb_{20}$ of the ink channel $IC_{20}$.

The first ink that has flowed out from the downstream end $ICb_{20}$ of the ink channel $IC_{20}$ flows into the first reservoir portion R1 from the ink supply port $ISP_{30}$ of the sub-tank 30 via a duct. The first ink has its temperature raised by the sub-tank heater 34, inside the first reservoir portion R1.

The first ink on the inside of the first reservoir portion R1 is supplied to the first ink supply port SP1 of each of the ten ink flow port sets S in the bottom portion 33, by the distribution channel DC in the lower portion of the sub-tank 30, and passes along the first ink supply tube IST1 to flow into each of the ten head mechanisms 40 from the first ink supply tube connecting portion ISC1 of each of the ten head mechanisms 40. At this time, the first ink flowing along the first ink supply tube IST1 has its temperature maintained or its temperature raised by heat radiated from the radiation sheet 23 of the preheating channel 20.

The first ink that has flowed into the head mechanism 40 flows along the first and second manifolds M1, M2 inside the head mechanism 40, and is discharged onto the medium PM from the nozzles 3 of the individual channels iCH connected to these first and second manifolds M1, M2. The first ink flowing along the manifolds M1, M2 has its temperature raised by the head heater mechanism 47. Moreover, the first ink that has not been discharged from the nozzles 3 flows into the first ink discharge port DP1 of the ink flow port set S, via the first ink discharge tube IDT1, from the first ink discharge tube connecting portion IDC1 of the head mechanism 40, and reaches the second reservoir portion R2 via the distribution channel DC. Subsequently, the first ink flows out from the ink discharge port $IDP_{30}$ on the front side of the sub-tank 30, reaches the ink discharge port $IDP_{10}$ of the casing 10 via a duct, and is returned to the reservoir 500.

Now, a channel on a downstream side of the ink supply port $ISP_{10}$ on the front side of the casing 10 and an upstream side of the ink supply port $ISP_{30}$ of the sub-tank 30 is assumed to be a front side supply channel $IC_{S1}$. The front side supply channel $IC_{S1}$ is a channel leading from the ink supply port $ISP_{10}$ on the front side of the casing 10 to the ink supply port $ISP_{30}$ of the sub-tank 30 via the ink channel $IC_{20}$ in the preheating channel 20 on the front side.

As depicted in FIG. 22, a second ink (which may be a different kind from the first ink) that has been supplied to the ink supply port $ISP_{10}$ on the rear side, of the two ink supply ports $ISP_{10}$ of the casing 10, from the reservoir 500, flows into the upstream end $ICa_{20}$ of the ink channel $IC_{20}$ of the preheating channel 20 on the rear side via a duct, and, after having had its temperature raised in the ink channel $IC_{20}$, flows out from the downstream end $ICb_{20}$ of the ink channel $IC_{20}$.

The second ink that has flowed out from the downstream end $ICb_{20}$ of the ink channel $IC_{20}$ flows into the fourth reservoir portion R4 from the ink supply port $ISP_{30}$ of the sub-tank 30 via a duct. The second ink has its temperature raised by the sub-tank heater 34, inside the fourth reservoir portion R4.

The second ink on the inside of the fourth reservoir portion R4 is supplied to the second ink supply port SP2 of each of the ten ink flow port sets S in the bottom portion 33, by the distribution channel DC in the lower portion of the sub-tank 30, and passes along the second ink supply tube IST2 to flow into each of the ten head mechanisms 40 from the second ink supply tube connecting portion ISC2 of each of the ten head mechanisms 40. At this time, the second ink flowing along the second ink supply tube IST2 has its temperature maintained or its temperature raised by heat radiated from the radiation sheet 23 of the preheating channel 20.

The second ink that has flowed into the head mechanism 40 flows along the third and fourth manifolds M3, M4 inside the head mechanism 40, and is discharged onto the medium PM from the nozzles 3 of the individual channels iCH connected to these third and fourth manifolds M3, M4. The second ink flowing along the manifolds M3, M4 has its temperature raised by the head heater mechanism 47. Moreover, the second ink that has not been discharged from the nozzles 3 flows into the second ink discharge port DP2 of the ink flow port set S, via the second ink discharge tube IDT2, from the second ink discharge tube connecting portion IDC2 of the head mechanism 40, and reaches the third reservoir portion R3 via the distribution channel DC. Subsequently, the second ink flows out from the ink discharge port $IDP_{30}$ of the sub-tank 30, reaches the ink discharge port $IDP_{10}$ of the casing 10 via a duct, and is returned to the reservoir 500.

Now, a channel on a downstream side of the ink supply port $ISP_{10}$ on the rear side of the casing 10 and an upstream side of the ink supply port $ISP_{30}$ of the sub-tank 30 is assumed to be a rear side supply channel $IC_{S2}$. The rear side supply channel $IC_{S2}$ is a channel leading from the ink supply port $ISP_{10}$ on the rear side of the casing 10 to the ink supply port $ISP_{30}$ of the sub-tank 30 via the ink channel $IC_{20}$ in the preheating channel 20 on the rear side.

<Disposition of Each Structure Between Sub-Tank 30 and Head Mechanism 40>

Now, disposition (arrangement) of each structure provided in a space between the sub-tank 30 and the head mechanism(s) 40 will be described, mainly with reference to FIGS. 2, 18, and 19. Note that the dispositions, positional relationships, and so on, of each of the structures described below are those of the present embodiment, and that the present invention is not limited to the forms described below.

A center position in the front-rear direction of the first portion 11 of the casing 10, that is, a center position in the front-rear direction of a space between the front wall 11*c* and the rear wall 11*d* is assumed to be a center portion 11C (depicted by a one dot chain line in FIG. 18). If a distance between an inner surface (rear surface) of the front wall 11*c* and an inner surface (front surface) of the rear wall 11*d* is assumed to be D, then a distance along the front-rear direction between the inner surface of the front wall 11*c* and center portion 11C and a distance along the front-rear direction between the inner surface of the rear wall 11*d* and center portion 11C will both be D/2. D may be set to about 80 mm to 100 mm, for example.

The sub-tank 30 is disposed such that a center in the front-rear direction of the main body portion 31 is positioned on the center portion 11C. A dimension in the front-rear direction of the sub-tank 30 may be set to 75 mm to 95 mm, for example (note, smaller than D). A dimension of a gap defined by the front wall 31*c* of the sub-tank 30 and inner surface of the front wall 11*c* of the first portion 11 and a dimension of a gap defined by the rear wall 31*d* of the sub-tank 30 and inner surface of the rear wall 11*d* of the first portion 11 are equal to each other, and may each be set to about 1 mm to 5 mm, for example.

Below the sub-tank 30 which is long and extends along the width direction, and above the ten head mechanisms 40 which are aligned staggered along the width direction, there are disposed: the two preheating channels 20 extending in the width direction; the ten sets of ink tube sets ITS (that is, the ten sets of ink supply tubes IST1, IST2 and ink discharge tubes IDT1, IDT2) extending in the up-down direction and provided one each for each of the ten head mechanisms 40; the two each of the coolant supply manifolds 51 and coolant discharge manifolds 53 extending in the width direction; the ten coolant supply tubes 52 (illustration of which is omitted in FIG. 18); and the ten coolant discharge tubes 54 (illustration of which is omitted in FIG. 18).

In the present embodiment, the two preheating channels 20, the ten sets of ink tube sets ITS, the two each of the coolant supply manifolds 51 and coolant discharge manifolds 53, and the ten each of the coolant supply tubes 52 and coolant discharge tubes 54 are disposed so as to be contained within the plane-of-projection in the up-down direction of the sub-tank 30 in the front-rear direction. Moreover, the first and second ink supply tube connecting portions ISC1, ISC2, the first and second ink discharge tube connecting portions IDC1, IDC2, the coolant supply tube connecting portion CSC, and the coolant discharge tube connecting portion CDC of each head mechanism 40 are also disposed so as to be contained within the plane-of-projection in the up-down direction of the sub-tank 30 in the front-rear direction.

Now, each structure being disposed so as to be contained within the plane-of-projection in the up-down direction of the sub-tank 30 means that at each position along the width direction, a front end portion at said position of each structure is positioned at the rear side of (further to the rear than) a front end portion at said position of the sub-tank 30, and a rear end portion at said position of each structure is positioned at the front side of (further to the front than) a rear end portion at said position of the sub-tank 30. In FIG. 18, the dotted line $L_{30f}$ indicates a position of a front surface of the front wall 31*c* of the sub-tank 30 (a front end of the sub-tank 30 in the present embodiment), and the dotted line $L_{30r}$ indicates a position of a rear surface of the rear wall 31*d* of the sub-tank 30 (a rear end of the sub-tank 30 in the present embodiment).

In the present embodiment, the preheating channel 20 disposed directly above the head mechanisms 40 included in the front line FL, the ink tube sets ITS connected to the head mechanisms 40 included in the front line FL, and the coolant supply manifold 51 and coolant discharge manifold 53 connected to the head mechanisms 40 included in the front line FL are contained between the inner surface (rear surface) of the front wall 11*c* and the center portion 11C in the front-rear direction. In other words, they are contained within a range of D/2 rearward from the inner surface of the front wall 11*c*. Furthermore, the preheating channel 20 disposed directly above the head mechanisms 40 included in the front line FL, the ink tube sets ITS connected to the head mechanisms 40 included in the front line FL, and the coolant supply manifold 51 and coolant discharge manifold 53 connected to the head mechanisms 40 included in the front line FL are contained between the front end of the sub-tank 30 and the center portion 11C of the first portion 11 in the front-rear direction. In other words, they are disposed so as to be contained within the plane-of-projection in the up-down direction of the sub-tank 30 in the front-rear direction, and are disposed so as to be contained in a region at the front side of (further to the front than) the center portion 11C of the first portion 11.

Similarly, the preheating channel 20 disposed directly above the head mechanisms 40 included in the rear line RL, the ink tube sets ITS connected to the head mechanisms 40 included in the rear line RL, and the coolant supply manifold 51 and coolant discharge manifold 53 connected to the head mechanisms 40 included in the rear line RL are contained between the inner surface (front surface) of the rear wall 11*d* and the center portion 11C in the front-rear direction. In other words, they are contained within a range of D/2 frontward from the inner surface of the rear wall 11*d*. Furthermore, the preheating channel 20 disposed directly above the head mechanisms 40 included in the rear line RL, the ink tube sets ITS connected to the head mechanisms 40 included in the rear line RL, and the coolant supply manifold 51 and coolant discharge manifold 53 connected to the head mechanisms 40 included in the rear line RL are contained between the rear end of the sub-tank 30 and the center portion 11C of the first portion 11 in the front-rear direction. In other words, they are disposed so as to be contained within the plane-of-projection in the up-down direction of the sub-tank 30 in the front-rear direction, and are disposed so as to be contained in a region at the rear side of (further to the rear than) the center portion 11C of the first portion 11.

The preheating channel 20 is disposed such that a longitudinal direction of said preheating channel 20 (the channel block 21) will be parallel to a direction that the nozzle line $L_3$ of each head mechanism 40 extends.

The preheating channel 20 is positioned directly above the coolant supply tube connecting portion CSC and coolant discharge tube connecting portion CDC of each head mechanism 40. That is, the preheating channel 20 is positioned above the coolant supply tube connecting portion CSC and coolant discharge tube connecting portion CDC such that at least part of the preheating channel 20 (more specifically, the channel block 21) and at least part of the coolant supply tube connecting portion CSC and coolant discharge tube connecting portion CDC overlap in the front-rear direction.

The ink supply tubes IST1, IST2 and the ink discharge tubes IDT1, IDT2 extend in the up-down direction, that is, a direction orthogonal to the upper surface (upper surface of connecting plate 41) and nozzle surface 40*n* of each head mechanism 40, in an entire region between the sub-tank 30 and the head mechanism 40, at substantially a center portion in the front-rear direction of each head mechanism 40. In each of the ink supply tubes IST1, IST2 and ink discharge tubes IDT1, IDT2, the upstream end of the tube and the downstream end of the tube are disposed at the same position as each other in planar view.

The coolant supply manifold 51 and the coolant discharge manifold 53 are disposed so as to extend parallel to a direction that the nozzle line $L_3$ of each head mechanism 40 extends.

The coolant supply manifold 51 and the coolant discharge manifold 53 are positioned directly above the wiring connection portions WC of the head mechanisms 40 to which said manifolds are connected. That is, the coolant supply manifold 51 and the coolant discharge manifold 53 are positioned above the wiring connection portions WC such that at least part of the coolant supply manifold 51 and at least part of the coolant discharge manifold 53, and at least parts of the wiring connection portions WC overlap with each other in the front-rear direction.

The coolant discharge manifold 53 is positioned directly above the coolant supply manifold 51 connected to the head mechanisms 40 to which said coolant discharge manifold 53 is connected. That is, the coolant discharge manifold 53 is positioned above the coolant supply manifold 51 such that at least part of the coolant discharge manifold 53 and at least part of the coolant supply manifold 51 overlap with each other in the width direction. Note that, contrarily, the coolant supply manifold 51 may be positioned directly above the coolant discharge manifold 53.

The coolant supply manifold 51 and the coolant discharge manifold 53 are disposed at a different position from the coolant supply tube connecting portions CSC and coolant discharge tube connecting portions CDC of the head mechanisms 40 to which said manifolds are connected, in the front-rear direction. More specifically, the coolant supply manifold 51 and the coolant discharge manifold 53 are disposed on an opposite side to the coolant supply tube connecting portions CSC and coolant discharge tube connecting portions CDC with reference to the ink tube sets ITS connected to said head mechanisms 40. That is, the coolant supply manifold 51 and coolant discharge manifold 53 and the coolant supply tube connecting portions CSC and coolant discharge tube connecting portions CDC are disposed sandwiching the ink tube sets ITS in the front-rear direction.

Thus, by the coolant supply manifold 51 and coolant discharge manifold 53 connected to a certain head mechanism 40 being disposed on an opposite side to the coolant supply tube connecting portion CSC and coolant discharge tube connecting portion CDC of the certain head mechanism 40 with reference to the ink tube set ITS connected to the certain head mechanism 40, the coolant supply manifold 51 and coolant discharge manifold 53 can be disposed aligned in the up-down direction, without paths of the coolant supply tube 52 and coolant discharge tube 54 being made complicated. Hence, the coolant supply manifold 51 and coolant discharge manifold 53 can be compactly disposed in the front-rear direction.

The coolant supply tube 52 extends in a direction inclined with respect to the front-rear direction and the width direction along a plane including the front-rear direction and the width direction, above each head mechanism 40, to connect the coolant supply manifold 51 and the coolant supply tube connecting portion CSC. The coolant discharge tube 54 extends in a direction inclined with respect to the front-rear direction and the width direction along a plane including the front-rear direction and the width direction, above each head mechanism 40, to connect the coolant discharge manifold 53 and the coolant discharge tube connecting portion CDC.

The preheating channel 20 directly above a certain head mechanism 40 is disposed forward of the first ink supply tube IST1 and first ink discharge tube IDT1 connected to the certain head mechanism 40, in such a manner that the rear surface 211*d* of the main body portion 211 of the channel block 21 faces outer peripheral surfaces of the first ink supply tube IST1 and first ink discharge tube IDT1 connected to the certain head mechanism 40. Specifically, the preheating channel 20 is disposed such that a lower end portion of the channel block 21 is positioned more upwardly than upper ends of the joint portions JT of the first ink supply tube IST1 and first ink discharge tube IDT1, that is, such that an entire region of the rear surface 211*d* in the up-down direction faces the main portions MT of the first ink supply tube IST1 and first ink discharge tube IDT1. By there being made different in the up-down direction positions of the joint portions JT that have larger outer diameters than the main portions MT and a position of the channel block 21, a gap between the rear surface 211*d* of the channel block 21 and the main portions MT of the first ink supply tube IST1 and first ink discharge tube IDT1 can be reduced. Hence, the preheating channel 20 and the ink tube set ITS can be compactly disposed in the front-rear direction, and heat radiated from the radiation sheet 23 of the preheating channel 20 can be efficiently applied to ink flowing through the ink tube set ITS.

The coolant supply manifold 51 and coolant discharge manifold 53 connected to a certain head mechanism 40 are each disposed rearward of the second ink supply tube IST2 and second ink discharge tube IDT2 connected to the certain head mechanism 40, in such a manner that outer peripheral surfaces of the manifolds face outer peripheral surfaces of the second ink supply tube IST2 and second ink discharge tube IDT2 connected to the certain head mechanism 40. Specifically, the coolant supply manifold 51 and coolant discharge manifold 53 are each disposed such that their lower end portions are positioned more upwardly than upper ends of the joint portions JT of the second ink supply tube IST2 and second ink discharge tube IDT2, that is, such that an entire region of the coolant supply manifold 51 in the up-down direction and entire region of the coolant discharge manifold 53 in the up-down direction face the main portions MT of the second ink supply tube IST2 and second ink discharge tube IDT2. By there being made different in the up-down direction positions of the joint portions JT that have larger outer diameters than the main portions MT and positions of the coolant supply manifold 51 and coolant discharge manifold 53, a gap between the outer peripheral surfaces of the coolant supply manifold 51 and coolant discharge manifold 53 and the main portions MT of the second ink supply tube IST2 and second ink discharge tube IDT2 can be reduced. Hence, the coolant supply manifold 51 and coolant discharge manifold 53 and the ink tube set ITS can be compactly disposed in the front-rear direction.

The preheating channel 20 positioned above a certain head mechanism 40, the ink tube set ITS connected to the certain head mechanism 40, and the coolant supply manifold 51 and coolant discharge manifold 53 connected to the certain head mechanism 40 are aligned in the front-rear direction. That is, the preheating channel 20 positioned above a certain head mechanism 40 and the coolant supply manifold 51 and coolant discharge manifold 53 connected to the certain head mechanism 40 face each other in the front-rear direction sandwiching the ink tube set ITS connected to the certain head mechanism 40. In other words, the ink tube set ITS connected to a certain head mechanism 40 is positioned between the preheating channel 20 positioned above the certain head mechanism 40 and the coolant supply manifold 51 and coolant discharge manifold 53 connected to the certain head mechanism 40.

The preheating channel 20 positioned above a certain head mechanism 40 and the coolant supply manifold 51 and coolant discharge manifold 53 connected to the certain head mechanism 40 are at the same position in the up-down direction. That is, when viewed in the width direction, the lower end portion of the coolant supply manifold 51 and lower end portion of the coolant discharge manifold 53 are positioned more upwardly than the lower end portion of the channel block 21 of the preheating channel 20, and the upper end portion of the coolant supply manifold 51 and upper end portion of the coolant discharge manifold 53 are positioned more downwardly than the upper end portion of the channel block 21 of the preheating channel 20.

<Temperature Control>

Next, temperature control of ink flowing in the head system 100 executed by the controller 600 in the liquid discharging device 900 of the present embodiment, will be described exemplifying the case where the ink is UV ink.

An optimum discharge temperature (a temperature most suitable for discharge from the nozzles 3 of the head mechanism 40) of UV ink is approximately 39° C. to 41° C. Hence, the controller 600 controls the temperature of ink flowing in the head system 100 such that a temperature of the ink discharged from the nozzles 3 of the head mechanism 40 will be approximately 40° C.

Description will be made here of temperature control of ink flowing along the channel on the front side depicted in FIG. 21. However, temperature control of ink flowing along the channel on the rear side depicted in FIG. 22 is also substantively the same as temperature control of ink flowing along the channel on the front side.

The controller 600 performs temperature control of ink by controlling power (output power) of the heater module 22 of the preheating channel 20, the sub-tank heater 34 of the sub-tank 30, and the head heater mechanism 47 of the head mechanism 40. Note that the controller 600 is assumed here to perform temperature control of ink without performing active control (alteration) of flow rate (flow speed) of ink flowing in the head system 100. However, the controller 600 may be caused to perform active control of flow rate of the ink.

(1) Control of Heater Module 22

The controller 600 controls the heater module 22 such that ink at T0 [° C.] that has flowed into the head system 100 via the ink supply port $ISP_{10}$ has its temperature raised to T1 [° C.] in the front side supply channel $IC_{S1}$. That is, the controller 600 controls power (output power) of the heater module 22 with a target temperature for ink temperature control in the front side supply channel $IC_{S1}$ set at T1 [° C.].

Hereafter, the temperature T0 [° C.] will be appropriately written as "initial temperature T0", and the temperature T1 [° C.] will be appropriately written as "supply channel target temperature T1". Moreover, a difference of the initial temperature T0 subtracted from the supply channel target temperature T1 will be assumed to be ΔT1(=T1−T0), and, hereafter, will be appropriately written as "supply channel target temperature increase ΔT1".

The controller 600 acquires the temperature of ink flowing along the front side supply channel $IC_{S1}$ based on output of the temperature measuring device $TM_{20}$ provided in the vicinity of the upstream end $ICa_{20}$ of the ink channel $IC_{20}$. Since heating of the ink is not performed on an upstream side of the upstream end $ICa_{20}$ of the ink channel $IC_{20}$, the temperature of ink acquired based on output of the temperature measuring device $TM_{20}$ will be substantially equal to the initial temperature T0.

The controller 600 controls power of the heater module 22 based on the initial temperature T0 acquired via the temperature measuring device $TM_{20}$. An amount of heat applied to the ink depending on power of the heater module 22 is known based on structure (channel length, channel cross-sectional area, thermal conductivity of each structure, and so on) of the front side supply channel $IC_{S1}$ and on flow rate of the ink. Therefore, the controller 600 enables an amount of power (power output) of the heater module 22 required to achieve the supply channel target temperature T1 to be known, based on the initial temperature T0.

The initial temperature T0, which is a normal temperature (room temperature), is usually about 20° C. to 25° C. The supply channel target temperature T1 is approximately 34° C. to 36° C. in the present embodiment. The supply channel target temperature increase ΔT1 is approximately 9° C. to 16° C. in the present embodiment.

(2) Control of Sub-Tank Heater 34

The controller 600 controls the sub-tank heater 34 such that ink that has flowed into the first reservoir portion R1 of the sub-tank 30 via the ink supply port $ISP_{30}$ has its temperature raised to T2[° C.] in the sub-tank 30. That is, the controller 600 controls power of the sub-tank heater 34 with a target temperature for ink temperature control in the sub-tank 30 set at T2[° C.].

Hereafter, the temperature T2[° C.] will be appropriately written as "sub-tank target temperature T2". Moreover, a difference of the supply channel target temperature T1 subtracted from the sub-tank target temperature T2 will be assumed to be ΔT2 (=T2−T1), and, hereafter, will be appropriately written as "sub-tank target temperature increase ΔT2".

The controller 600 acquires the temperature of ink flowing out from the sub-tank 30 into the first ink supply tube IST1, based on output of the temperature measuring device $TM_{30}$ provided in the bottom plate 33 of the sub-tank 30. Then, the controller 600 controls power of the sub-tank heater 34 such that said temperature matches the sub-tank target temperature T2.

The sub-tank target temperature $T2$ is approximately 36° C. to 37° C. in the present embodiment. The sub-tank target temperature increase $\Delta T2$ is approximately 1° C. to 3° C. in the present embodiment.

(3) Control of Head Heater Mechanism 47

The controller 600 controls the head heater mechanism 47 such that ink that has flowed into the head mechanism 40 via the first ink supply tube IST1 has its temperature raised to T3[° C.] in the head mechanism 40. That is, the controller 600 controls output of the head heater mechanism 47 with a target temperature for ink temperature control in the head mechanism 40 set at T3[° C.].

Hereafter, the temperature T3[° C.] will be appropriately written as "target discharge temperature T3". Moreover, a difference of the sub-tank target temperature T2 subtracted from the target discharge temperature T3 will be assumed to be $\Delta T3$ ($=T3-T2$), and, hereafter, will be appropriately written as "head target temperature increase $\Delta T3$".

The controller 600 acquires the temperature of ink flowing in the manifolds M1, M2 based on output of the temperature measuring device $TM_{40}$ provided on the upper surface of the channel unit 461. Then, the controller 600 controls power of the head heater mechanism 47 such that said temperature matches the target discharge temperature T3.

The target discharge temperature T3 is approximately 39° C. to 41° C. being the optimum discharge temperature of UV ink, in the present embodiment. The head target temperature increase $\Delta T3$ is approximately 2° C. to 5° C. in the present embodiment.

Note that as previously mentioned, ink flowing along the first ink supply tube IST1 is applied with radiant heat from the radiation sheet 23 of the preheating channel 20, and sometimes, the ink has its temperature raised by the radiant heat. In this case, part of the head target temperature increase $\Delta T3$ is achieved by the radiant heat from the preheating channel 20.

Thus, the controller 600 gradually carries out warming via the preheating channels 20, sub-tank 30, and head mechanisms 40 such that the temperature of ink that has been supplied to the head system 100 will attain the optimum discharge temperature in the head mechanisms 40. The sub-tank target temperature T2 is higher than the supply channel target temperature T1, and the target discharge temperature T3 is higher than the sub-tank target temperature T2. That is, there holds a relationship of $T1<T2<T3$.

Moreover, the supply channel target temperature increase $\Delta T1$ is larger than the sub-tank target temperature increase $\Delta T2$ and the head target temperature increase $\Delta T3$.

Meaning of the preheating channels 20 being provided and meaning of warming of ink being performed in the preheating channels 20, the sub-tank 30, and each of the head mechanisms 40 in the head system 100 of the present embodiment, will now be described.

Head systems (head bar systems) are desired to be compact, and therefore it is thought that warming of ink is performed in the sub-tank usually included in the head system. However, the inventors of the present invention gained knowledge that when warming is performed in the sub-tank, deterioration may occur in formed image quality, and, after diligent research, found the reason for that to be variation in ink temperature among the plurality of heads arising from ink warming in the sub-tank. A specific explanation based on the knowledge of the inventors of the present invention is as follows.

The sub-tank, which is a tank for distributing ink to the plurality of heads, is configured so that ink that has flowed in from one inflow port is let flow out from a plurality of outflow ports. Now, the plurality of outflow ports, which are provided one each correspondingly to each of the plurality of heads, have differing positions from each other. Hence, channel lengths of channels leading to each of the plurality of outflow ports from the inflow port of the ink that are defined in the sub-tank, differ from each other. For example, in the present embodiment, the channel lengths from the ink supply port $ISP_{30}$ provided in the left wall 31*e* of the sub-tank 30 to each of the plurality of first ink supply ports SP1 disposed along the left-right direction, differ from each other. The most leftward positioned first ink supply port SP1 is closest to the ink supply port $ISP_{30}$ among the plurality of first ink supply ports SP1, hence the channel length of the channel leading to the most leftward positioned first ink supply port SP1 from the ink supply port $ISP_{30}$ is shortest. In contrast, the most rightward positioned first ink supply port SP1 is positioned furthest from the ink supply port $ISP_{30}$ among the plurality of first ink supply ports SP1, hence the channel length of the channel leading to the most rightward positioned first ink supply port SP1 from the ink supply port $ISP_{30}$ is longest.

Hence, when warming of ink is performed by the heater provided in the sub-tank, the channel length of a region where warming is performed will be shortest and the amount of temperature rise will be smallest for ink flowing out from the outflow port disposed in a vicinity of the inflow port into the sub-tank. Contrarily, the channel length of a region where warming is performed will be longest and the amount of temperature rise will be largest for ink flowing out from the outflow port disposed in a position far from the inflow port into the sub-tank.

Specifically, for example, it has been observed that when UV ink at 20° C. has been supplied to the first reservoir portion R1 from the ink supply port $ISP_{30}$ of the sub-tank 30 in the present embodiment, the ink flowing out from the first ink supply port SP1 positioned most leftward in the left-right direction will be at about 26° C., and the ink flowing out from the first ink supply port SP1 positioned most rightward in the left-right direction will be at about 36° C. In this case, a difference of about 10° C. in temperature of the ink flowing inside the head mechanisms 40 will occur between the head mechanism 40 positioned most leftward and the head mechanism 40 positioned most rightward in the width direction of the head system 100.

Thus, due to the plurality of first ink supply ports SP1 being aligned along a direction that the sub-tank heater extends, it is difficult for temperatures of ink flowing out from the plurality of outflow ports to be made uniform, and, consequently, difficult for temperatures of ink flowing through each of the plurality of heads to be made uniform when temperature raising of ink from the normal temperature or room temperature (that is, the initial temperature T0) is performed by the sub-tank. Hence, temperatures and viscosities of ink for each head end up differing, and deterioration may occur in quality of the image formed on the medium by discharge of the ink.

In contrast, by the preheating channel 20 being provided on the upstream side of the sub-tank 30 and temperature of ink flowing into the sub-tank 30 being warmed in advance by the preheating channel 20 as in the present embodiment, the amount of temperature rise having to be realized by warming performed by the sub-tank 30 can be reduced. Therefore, a range of variation in ink temperatures between heads that may occur due to warming performed by the sub-tank 30 can be reduced.

Specifically, for example, it has been observed that when the head system 100 of the present embodiment is employed to perform temperature control with the supply channel target temperature T1 set at 34.7° C., the sub-tank target temperature T2 set at 36.5° C., and the target discharge temperature T3 set at 40° C., variation in temperatures of UV ink flowing through each of the ten head mechanisms 40 will be 0.6° C. or less.

Moreover, by the preheating channel 20 being provided within the head system 100 and being directly connected to the upstream side of the sub-tank 30, ink that has been warmed by the preheating channel 20 can be let flow into the sub-tank 30 substantially without suffering a drop in temperature. Hence, warming of ink towards the optimum discharge temperature can be efficiently performed.

Note that the preheating channel 20 being directly connected to the upstream side of the sub-tank 30 means that no tank, pump, or valve is provided between the preheating channel 20 and the sub-tank 30. Moreover, in the present embodiment, the channel length between the downstream end $ICb_{20}$ of the preheating channel 20 and the ink supply port $ISP_{30}$ of the sub-tank 30 is smaller than the channel length of the ink channel $IC_{20}$.

Moreover, by the preheating channel 20 being provided within the head system 100, warming capacity within the head system 100 increases. Therefore, ink flowing within the head system 100 can be warmed to the optimum discharge temperature without flow rate of the ink being lowered.

Since the head system 100 does not have a function of cooling ink in the ink channel (since the chiller 60 does not perform cooling of ink), temperature of the ink cannot be lowered actively within the head system 100. Therefore, if the sub-tank target temperature T2 is set higher than the target discharge temperature T3, or the supply channel target temperature T1 is set higher than the target discharge temperature T3, there is a risk that ink in the head mechanism 40 will end up exceeding the target discharge temperature T3 (that is, the optimum discharge temperature), and that quality of the image formed will deteriorate. By the supply channel target temperature T1 and sub-tank target temperature T2 being set lower than the target discharge temperature T3, such deterioration of image quality can be suppressed.

Advantages effects of the head system 100 of the present embodiment will be summarized below.

In the head system 100 of the present embodiment, the first and second ink supply tubes IST1, IST2 and the first and second ink discharge tubes IDT1, IDT2 included in the ink tube set ITS are linearly disposed in the up-down direction in an entire region between the sub-tank 30 and the head mechanism 40, and the ink tube set ITS and the coolant supply manifold 51 and coolant discharge manifold 53 are aligned in the front-rear direction and contained between the front wall 11*c* and rear wall 11*d* of the first portion 11 of the casing 10. Hence, a dimension in the front-rear direction of the head system 100 can be reduced, and the head system 100 can be compactly configured.

In the head system 100 of the present embodiment, the preheating channels 20, the ink tube sets ITS, and the coolant supply manifolds 51 and coolant discharge manifolds 53 are disposed so as to be contained within the plane-of-projection in the up-down direction of the sub-tank 30 in the front-rear direction. Hence, the dimension in the front-rear direction of the head system 100 can be further reduced, and the head system 100 can be more compactly configured.

In the head system 100 of the present embodiment, in each of the ten head mechanisms 40, the coolant supply tube connecting portion CSC, the coolant discharge tube connecting portion CDC, the first ink supply tube connecting portion ISC1, and the first ink discharge tube connecting portion IDC1 are disposed staggered along the width direction. Moreover, the first ink supply tube connecting portion ISC1, the first ink discharge tube connecting portion IDC1, the second ink supply tube connecting portion ISC2, and the second ink discharge tube connecting portion IDC2 are disposed staggered along the width direction. Moreover, the coolant supply tube connecting portion CSC, the coolant discharge tube connecting portion CDC, the second ink supply tube connecting portion ISC2, and the second ink discharge tube connecting portion IDC2 are disposed staggered along the width direction.

Each connecting portion is to be connected to the joint portion JT of each ink tube of the ink tube set ITS, hence in the case of each connecting portion being disposed at the same position in the width direction, each connecting portion must be separated by a certain degree of distance in the front-rear direction in order to avoid interference of fellow joint portions JT. In contrast, if a staggered disposition is employed, then a separation distance of fellow connecting portions can be reduced in the front-rear direction while interference of fellow joint portions JT is avoided, and excessive proximity of fellow connecting portions in the width direction can be avoided. Hence, the ink tube set ITS connected to each connecting portion can be disposed in a smaller region in the front-rear direction, and a dimension in the front-rear direction of the head mechanism 40 can also be reduced. Hence, the dimension in the front-rear direction of the head system 100 can be further reduced, and the head system 100 can be more compactly configured.

As well as it being desirable for the head system 100 to be compactly configured in terms of for example achieving downsizing of the printer 1000, reducing the dimension in the front-rear direction of the head system 100 further has the following significance.

As depicted in FIG. 1, when the medium PM undergoes image formation while being conveyed along the medium feeding direction, the medium PM sometimes ends up being conveyed in a direction deviating from the medium feeding direction. In this case, a center position of the medium PM ends up deviating from a conveying center (a center position in the medium width direction of a conveying path), and an image formation position on the medium PM also ends up deviating from an originally intended position.

Now, an amount of deviation from the conveying center of the medium PM gets larger as progress is made to a downstream side in the medium feeding direction (a discharge side), and, accordingly, deviation from the intended position of the image formation position also gets larger. Hence, by a plurality of the head systems 100 being disposed in a smaller region in the medium feeding direction, that is, by a distance from the nozzles positioned on the most upstream side in the medium feeding direction (a feeding side) to the nozzles positioned on the most downstream side in the medium feeding direction being reduced, deterioration of image quality (that is, deviation from the intended position of the image formation position) that may occur when the medium PM is conveyed in a direction deviating from the medium feeding direction, can be suppressed.

That is, by reducing the dimension in the front-rear direction of the head system 100, it becomes possible for the plurality of head systems 100 to be disposed in a smaller region in the medium feeding direction, and deterioration of image quality that may occur when the medium PM is conveyed in a direction deviating from the medium feeding direction can be suppressed.

Note that deviation from the medium feeding direction of the medium PM tends to occur more easily when rolled paper is employed as the medium PM. Hence, the head system 100 of the present embodiment is suitable also for use in a printing device that performs image formation on rolled paper.

The head system 100 of the present disclosure has the preheating channel 20 disposed inside the casing 10 on the upstream side of the sub-tank 30. Hence, temperature adjustment of ink supplied to the head mechanism 40 can be suitably performed.

Specifically, for example, by warming being performed by the preheating channel 20, variation in temperatures of ink flowing in the plurality of head mechanisms 40 may be suppressed. Moreover, even when flow rate of ink flowing through the head system 100 is large, warming of the ink can be sufficiently performed.

Moreover, since the preheating channel 20 is directly connected to the upstream side of the sub-tank 30, ink that has been warmed by the preheating channel 20 can be let flow into the sub-tank 30 substantially without suffering a temperature drop.

Advantages of the liquid discharging device 900 of the present embodiment comprising the head system 100 and the controller 600 will be summarized below.

In the liquid discharging device 900 of the present embodiment, the controller 600 controls the head system 100 such that the supply channel target temperature increase $\Delta$T1 will be larger than the sub-tank target temperature increase $\Delta$T2. As a result, temperature increase in the sub-tank 30 can be reduced, and variation in ink temperatures among the head mechanisms 40 can be suppressed.

In the liquid discharging device 900 of the present embodiment, the controller 600 sets the sub-tank target temperature T2 higher than the supply channel target temperature T1, and sets the target discharge temperature T3 higher than the sub-tank target temperature T2. Thus, by the target temperatures of temperature control being gradually raised from the upstream side to the downstream side, the need for ink to be cooled in the channel disappears, and warming can be efficiently performed.

In the liquid discharging device 900 of the present embodiment, the controller 600 controls the head system 100 such that the supply channel target temperature increase $\Delta$T1 will be larger than the head target temperature increase $\Delta$T3. That is, the controller 600 performs the majority of warming by the supply channels $IC_{S1}$, $IC_{S2}$, and, after having done so, slightly raises ink temperature by the sub-tank 30 and head mechanisms 40 to bring the ink temperature close to the optimum discharge temperature while finely adjusting. Such gradual temperature adjustment enables control of ink temperature to be minutely performed.

[Modified Examples]

In the head system 100 of the above-described embodiment, the following modified modes may also be employed.

In the head system 100 of the above-described embodiment, the casing 10 includes: the first portion 11; and the second portion 12 which is attachable/detachable to/from the first portion 11. However, the above-described embodiment is not limited to this. The casing 10 may have an arbitrary configuration, and the first portion 11 and second portion 12 may be formed integrally in an inseparable manner.

In the head system 100 of the above-described embodiment, a configuration of the preheating channel 20 is arbitrary. For example, the preheating channel 20 may be configured having a planar heater affixed directly to a metal-made circular duct. Moreover, the preheating channel 20 may be omitted.

In the ink channel $IC_{20}$ defined in the channel block 21 of the preheating channel 20 of the above-described embodiment, the first portion A1 and the second portion A2 extend in a plane including the left-right direction and the front-rear direction, that is, in a horizontal plane. However, the above-described embodiment is not limited to this. The ink channel $IC_{20}$ may be provided so as to gradually rise from the upstream end $ICa_{20}$ to the downstream end $ICb_{20}$. Specifically, for example, the first portion A1 may be provided so as to gradually rise from the left end Ale to the right end Alf, and the second portion A2 may be provided so as to gradually rise from the right end A2*f* to the left end A2*e*.

By the ink channel $IC_{20}$ being provided so as to gradually rise from the upstream end $ICa_{20}$ to the downstream end $ICb_{20}$, a bubble that has got mixed in in the ink channel $IC_{20}$ can be favorably let flow to the sub-tank 30. As a result, occurrence of a hot spot (a local high temperature portion due to temperature rise of the bubble) within the ink channel $IC_{20}$ can be suppressed.

Moreover, the ink channel $IC_{20}$ defined in the channel block 21 need not necessarily have a form of making a single round trip in the longitudinal direction along the channel block 21. Specifically, the ink channel $IC_{20}$ may be a channel that passes linearly right through between one end and the other end in the longitudinal direction of the channel block 21, or may be a channel that makes two or more round trips in the longitudinal direction along the channel block 21. By the ink channel $IC_{20}$ being lengthened, heat of the channel block 21 can be more efficiently applied to the ink.

The cross-sectional shape of the ink channel $IC_{20}$ need not necessarily be an ellipse. By the cross-sectional shape of the ink channel $IC_{20}$ being configured as an arbitrary longitudinal shape of the likes of an ellipse or rectangle, it becomes easier for a contact surface between ink flowing along the ink channel $IC_{20}$ and the channel block 21 to be enlarged, and heat can be efficiently applied to the ink. Note that the term "longitudinal shape" in relation to cross-sectional shape of a channel in the present invention means a two-dimensional shape whose dimension in a certain direction is larger than its dimension in an orthogonal direction orthogonal to the certain direction.

Figure 23:
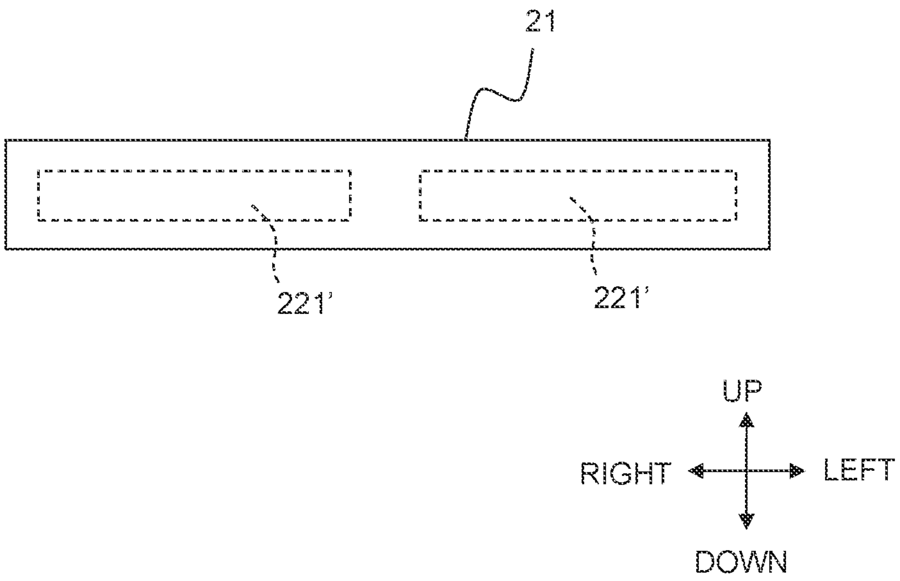
FIG. 23 is a side view of a channel block included in a preheating channel.

In the preheating channel 20 of the above-described embodiment, substantially an entire region in the longitudinal direction of the channel block 21 is abutted on by the heater 221 of the heater module 22. However, the above-described embodiment is not limited to this. Specifically, for example, a region excluding a center portion in the longitudinal direction of the channel block 21 may have a pair of heaters 221' provided therein, as depicted in FIG. 23.

Since heat that has been applied to the channel block 21 from the heater 221 tends to accumulate in the center portion in the longitudinal direction of the channel block 21, heat generated by the heater 221 may result in the center portion in the longitudinal direction of the channel block 21 being excessively heated. By there being employed a configuration not having a heater provided in the center portion in the longitudinal direction of the channel block 21, such excessive temperature rise of the center portion may be suppressed.

An area of a region not provided with a heater of the center portion in the longitudinal direction of the channel block 21 may be set to about 1/14 to 1/16 of an area of regions provided with a heater on both sides thereof.

Note that in the present invention, a "region provided with a heater" means a region on which a heat generating surface (a heat generating body) of the heater abuts directly or via a thermally negligible thin layer. Hence, for example, in the case of there being employed a heater having a laminated structure in which a planar heat generating body configured by heating wires is sandwiched by a pair of protective layers, a region abutted on by the heat generating body via the protective layers corresponds to a "region provided with a heater". On the other hand, a region abutted on by the protective layers alone without the heat generating body being present does not correspond to a "region provided with a heater" in the present invention, even though it is a region where part of the heater is provided.

The preheating channel 20 need not have the channel block 21. Specifically, for example, a planar heater may be directly affixed to a tubular channel. In this case, a region where the planar heater has been affixed in the tubular channel corresponds to a "portion heated by a heater". Moreover, each heater used in the above-described embodiment may be a linear heater.

In the liquid discharging device 900 of the above-described embodiment, the supply channel target temperature T1, the sub-tank target temperature T2, the target discharge temperature T3, the supply channel target temperature increase ΔT1, the sub-tank target temperature increase ΔT2, and the head target temperature increase ΔT3 are appropriately settable.

From a viewpoint of preventing variation in ink temperatures among the plurality of head mechanisms 40, the supply channel target temperature increase ΔT1 is desirably set as large as possible. Assuming a difference of the initial temperature T0 subtracted from the target discharge temperature T3 to be ΔT (=T3−T0) (hereafter, appropriately written as "head system target temperature increase ΔT), ΔT1 may be ΔT/2 or more, or may be ΔT/1.5 or more, for example.

Alternatively, each of the sub-tank target temperature increase ΔT2 and head target temperature increase ΔT3 may be set to 1/3 or less of the supply channel target temperature increase ΔT1, or may be set to 1/4 or less of the supply channel target temperature increase ΔT1.

In the liquid discharging device 900 of the above-described embodiment, when temperature of ink is low, the controller 600 may perform control in order that temperature of the ink is raised in a short time.

Specifically, for example, when temperature of ink flowing out from the sub-tank 30 acquired based on output of the temperature measuring device $TM_{30}$ of the sub-tank 30 is lower than the sub-tank target temperature T2, the controller 600 sets a temperature of the heater 221 in the heater module 22 of the preheating channel 20 to a temperature higher than the sub-tank target temperature T2. As a result, ink within the preheating channel 20 is heated in a short time. Subsequently, after temperature of the ink flowing out from the sub-tank 30 acquired based on output of the temperature measuring device $TM_{30}$ of the sub-tank 30 has reached the sub-tank target temperature T2, the controller 600 may lower temperature of the heater 221 to the sub-tank target temperature T2 or less. The controller 600 may estimate temperature of the heater 221 based on a certain calculation formula. Alternatively, the heater 221 may be provided with a thermistor, whereby actual measurement of temperature of the heater 221 is performed.

In the head system 100 of the above-described embodiment, the sub-tank 30 need not comprise the sub-tank heater 34, and the head mechanism 40 need not comprise the head heater mechanism 47.

The head system 100 of the above-described embodiment comprises ten head mechanisms 40 disposed staggered along the width direction. However, the above-described embodiment is not limited to this. The number of head mechanisms 40 that the head system 100 comprises is arbitrary. In a mode having at least three of the head systems 100, the head systems 100 may be disposed staggered.

In the head system 100 of the above-described embodiment, each of the first and second ink supply tubes IST1, IST2 and the first and second ink discharge tubes IDT1, IDT2 have the main portion MT and the joint portion JT whose outer diameter is larger than that of the main portion MT. However, the above-described embodiment is not limited to this.

Specifically, for example, each of the first and second ink supply tubes IST1, IST2 and the first and second ink discharge tubes IDT1, IDT2 may have the main portion MT only. In this case, connection of each ink tube and the head mechanism 40 may be performed by the connecting portion such as the first ink supply tube connecting portion ISC1 being inserted into a lower end portion of the main portion MT. In this case, a portion whose outer diameter has become larger of the ink tube by the ink tube being inserted with the connecting portion (connecting tube), or a portion whose outer diameter has become larger due to a portion where the ink tube has been inserted with the connecting portion (connecting tube) being surrounded by the likes of a fastening member, corresponds to the large-diameter portion of the present invention.

Moreover, the above-described connection mode of each ink tube and the head mechanism 40 may be applied to connection of each ink tube and the sub-tank 30. In this case, each ink tube has a large-diameter portion also in its upper end portion connected to the sub-tank 30.

In the present invention, the word "interface" employed in relation to connection of a duct (conduit, tube, pipe) and the head mechanism (head) means both a structure for connecting the duct to the head mechanism (for example, the first and second ink supply tube connecting portions ISC1, ISC2, and so on) and a region (contact point, contact surface) on a surface of the head mechanism that the duct has contacted (or will be in contact with) for connection.

In the head system 100 of the above-described embodiment, an entire region of the coolant supply manifold 51 in the up-down direction and entire region of the coolant discharge manifold 53 in the up-down direction are disposed so as to face the main portions MT of the second ink supply tube IST2 and second ink discharge tube IDT2. However, the above-described embodiment is not limited to this. A center portion in the up-down direction of the coolant supply manifold 51 or coolant discharge manifold 53 may be disposed so as to face the main portions MT of the second ink supply tube IST2 and second ink discharge tube IDT2. By the center portion of each circular tube-like manifold where width in the front-rear direction will be largest being disposed in this way, the coolant supply manifold 51 and coolant discharge manifold 53 and the ink tube set ITS can be compactly disposed in the front-rear direction. In the present invention, "the manifold being disposed at a position of the small-diameter portion (the main portion) in the up-down direction" includes both a state of the entire region in the up-down direction of the manifold having been disposed in a region where the small-diameter portion (main portion) is positioned in the up-down direction and a state of at least the center portion in the up-down direction of the manifold having been disposed in a region where the small-diameter portion (main portion) is positioned in the up-down direction.

The head system 100 of the above-described embodiment is configured to be able to simultaneously circulate two kinds of inks. However, the above-described embodiment is not limited to this. The head system 100 may be configured to circulate one kind of ink only.

Specifically, for example, with the sub-tank 30 configured having two reservoir portions only, the second ink supply port SP2 and second ink discharge port DP2 are omitted from the ink circulation port set S, and the distribution channel DC adopts a configuration where one of the two reservoir portions and the first ink supply port SP1 communicate, and the other of the two reservoir portions and the first ink discharge port DP1 communicate. Furthermore, the second ink supply tube IST2 and second ink discharge tube IDT2 are omitted from the ink tube set ITS, and the second ink supply tube connecting portion ISC2 and second ink discharge tube connecting portion IDC2 and channel structures related to these are omitted from the head mechanism 40.

The head system 100 of the above-described embodiment is a circulation-type head system comprising a structure for discharging (draining) to outside of the head system 100 ink that has not been discharged (ejected) by the head mechanism 40. However, the above-described embodiment is not limited to this. The head system 100 of the above-described embodiment may have each ink discharge (draining)-related configuration omitted therefrom.

Above is description of the embodiment and modified examples exemplifying the case of ink being discharged from the head system 100 to form an image on the medium PM. The head system 100 may be a liquid discharging system discharging an arbitrary liquid for the image formation, and the medium PM on which the image is formed may be the likes of a paper sheet, cloth, or a resin, for example. Moreover, the head system 100 may be employed as a head system of a serial head type printer.

The embodiment described in the present specification is in all respects an exemplification, and should not be considered limiting. For example, the number, configuration, and so on, of the head systems 100 in the printer 1000 may be changed. The number of colors simultaneously printable by the printer 1000 is not limited either, and there may be a configuration enabling single-color printing only. Moreover, the number, disposition, and so on, of the individual channels iCH may also be appropriately changed. Moreover, technical features described in each embodiment and modified example are combinable with each other.

As long as features of the present invention are maintained, the present invention is not limited to the above-described embodiment, moreover, other forms conceivable in the range of technical ideas of the present invention are also included in the range of the present invention.

What is claimed is:

1. A head system comprising:

a plurality of heads disposed staggered along a first direction;

a sub-tank which is disposed above the plurality of heads and which is configured to distribute a liquid to each of the plurality of heads;

a plurality of liquid channels each fluidly connects the sub-tank and one of the plurality of heads;

a chiller configured to cool the plurality of heads by a coolant, the chiller including a manifold which is disposed between the plurality of heads and the sub-tank in an up-down direction and which extends in the first direction to distribute the coolant to the plurality of heads; and a casing having a pair of inner surfaces opposed to each other in a second direction orthogonal to the first direction and the up-down direction, the casing housing the sub-tank, the chiller, and the plurality of liquid channels, wherein each of the plurality of liquid channels extends linearly parallel to the up-down direction in an entire region between the sub-tank and one of the plurality of heads, and each of the plurality of liquid channels and the manifold are aligned in the second direction between the pair of inner surfaces of the casing.

2. The head system according to claim 1, wherein each of the plurality of liquid channels and the manifold are disposed so as to be contained within a plane-of-projection in the up-down direction of the sub-tank in the second direction.

3. The head system according to claim 2, further comprising:

a longitudinal member extending in the first direction and having a supply channel, configured to supply the liquid to the sub-tank, defined inside of the longitudinal member; and a heater thermally connected to the longitudinal member, wherein the longitudinal member is disposed between the sub-tank and the plurality of heads in the up-down direction, and is disposed opposite from the manifold with respect to the plurality of liquid channels in the second direction, and the longitudinal member is disposed so as to be contained within the plane-of-projection in the up-down direction of the sub-tank in the second direction.

4. The head system according to claim 3, wherein each of the plurality of liquid channels includes a large-diameter portion connected to one of the plurality of heads, and a small-diameter portion positioned above the large-diameter portion, an outer diameter of the small-diameter portion being smaller than an outer diameter of the large-diameter portion, and the longitudinal member is disposed at a position of the small-diameter portion in the up-down direction.

5. A liquid discharging device comprising:

the head system according to claim 3; and a controller configured to control the head system, wherein the head system further comprises a sub-tank heater configured to heat the liquid in the sub-tank, and the controller is configured to control the head system such that a rise amount of temperature of the liquid due to the heater is larger than a rise amount of temperature of the liquid due to the sub-tank heater.

6. The liquid discharging device according to claim 5, wherein the head system further comprises a head heater provided to each of the plurality of heads, and the controller is configured to control the head system such that a rise amount of temperature of the liquid due to the heater will be larger than a rise amount of temperature of the liquid due to the head heater.

7. The liquid discharging device according to claim 6, wherein provided that a temperature of the liquid flowing into the sub-tank is T1, a temperature of the liquid flowing out from the sub-tank is T2, and a temperature of the liquid discharged from the plurality of heads is T3, the controller is configured to control the head system such that T3>T2, or T3>T1.

8. The liquid discharging device according to claim 7, wherein the controller is configured to control the head system such that T2>T1.

9. A printing device comprising:

the liquid discharging device according to claim 5; and a conveying device configured to convey a medium toward the plurality of heads.

10. A method for supplying a liquid to a plurality of heads in a head system as defined in claim 3, the method comprising:

feeding the liquid to the sub-tank via the supply channel, while raising a temperature of the liquid by ΔT1° C. by controlling the heater configured to heat the liquid in the supply channel with a controller configured to control the head system;

then, raising a temperature of the liquid by ΔT2° C. smaller than ΔT1° C. in the sub-tank by controlling a sub-tank heater configured to heat the liquid in the sub-tank with the controller; and then, feeding the liquid in the sub-tank to each of the plurality of heads.

11. The method according to claim 10, further including raising a temperature of the liquid by ΔT3° C. smaller than ΔT1° C. in each of the plurality of heads by controlling a head heater provided to each of the plurality of heads with the controller.

12. The method according to claim 11, wherein provided that a temperature of the liquid flowing into the sub-tank is T1, a temperature of the liquid flowing out from the sub-tank is T2, and a temperature of the liquid discharged from the plurality of heads is T3, the head heater and the sub-tank heater are controlled with the controller to raise a temperature of the liquid such that T3>T2, or the head heater and the heater are controlled with the controller to raise the temperature of the liquid such that T3>T1.

13. The method according to claim 12, wherein the sub-tank heater and the heater are controlled with the controller to raise the temperature of the liquid such that T2>T1.

14. The head system according to claim 2, further comprising:

a circuit board having a mounting surface disposed parallel to a plane including the first direction and the second direction; and a plurality of flexible wiring boards each connecting the circuit board and one of the plurality of heads, wherein the circuit board is disposed so as to be contained within the plane-of-projection in the up-down direction of the sub-tank in the second direction, and a part of each of the plurality of flexible wiring boards is disposed in a gap between the sub-tank and either one of the pair of inner surfaces of the casing.

15. The head system according to claim 14, wherein the casing has a side wall orthogonal to the first direction, the side wall is provided with a connector electrically connected to the circuit board, a liquid supply port fluidly connected to the sub-tank; and a coolant supply port fluidly connected to the manifold, and the connector is provided above the liquid supply port and the coolant supply port.

16. The head system according to claim 15, wherein the liquid supply port is provided above the coolant supply port.

17. The head system according to claim 1, wherein each of the plurality of liquid channels has a large-diameter portion connected to one of the plurality of heads, and a small-diameter portion positioned above the large-diameter portion, an outer diameter of the small-diameter portion being smaller than an outer diameter of the large-diameter portion, and the manifold is disposed at a position of the small-diameter portion in the up-down direction.

18. The head system according to claim 17, wherein the sub-tank includes:

a reservoir configured to store the liquid; and a distribution channel configured to distribute the liquid in the reservoir to each of the plurality of liquid channels, the plurality of liquid channels includes two liquid channels provided to each of the plurality of heads, the two liquid channels including a supply tube configured to feed the liquid to one of the plurality of heads from the sub-tank and a discharge tube configured to feed the liquid to the sub-tank from one of the plurality of heads, each of the plurality of heads includes:

a supply tube connecting interface connected with the large-diameter portion of the supply tube;

a discharge tube connecting interface connected with the large-diameter portion of the discharge tube;

a coolant supply tube connecting interface connected with a coolant supply tube configured to feed the coolant to the head from the manifold; and a coolant discharge tube connecting interface connected with a coolant discharge tube configured to feed the coolant to the manifold from the head, in each of the plurality of heads, the supply tube connecting interface and the discharge tube connecting interface are aligned in the first direction, the coolant supply tube connecting interface and the coolant discharge tube connecting interface are aligned in the first direction, and the supply tube connecting interface and discharge tube connecting interface and the coolant supply tube connecting interface and coolant discharge tube connecting interface are at different positions to each other in the second direction, and the supply tube connecting interface, the discharge tube connecting interface, the coolant supply tube connecting interface, and the coolant discharge tube connecting interface are disposed so as to be contained within a plane-of-projection in the up-down direction of the sub-tank.

19. The head system according to claim 18, wherein in each of the plurality of heads, the supply tube connecting interface, the discharge tube connecting interface, the coolant supply tube connecting interface, and the coolant discharge tube connecting interface are disposed staggered along the first direction.

20. The head system according to claim 17, wherein the sub-tank includes:

a reservoir configured to store the liquid; and a distribution channel configured to distribute the liquid in the reservoir to each of the plurality of liquid channels, the plurality of liquid channels includes four liquid channels provided to each of the plurality of heads, the four liquid channels including a first supply tube and a second supply tube configured to feed the liquid to one of the plurality of heads from the sub-tank and a first discharge tube and a second discharge tube configured to feed the liquid to the sub-tank from one of the plurality of heads, each of the plurality of heads includes:

a first supply tube connecting interface connected with the large-diameter portion of the first supply tube;

a second supply tube connecting interface connected with the large-diameter portion of the second supply tube;

a first discharge tube connecting interface connected with the large-diameter portion of the first discharge tube;

a second discharge tube connecting interface connected with the large-diameter portion of the second discharge tube;

a coolant supply tube connecting interface connected with a coolant supply tube configured to feed the coolant to the head from the manifold; and a coolant discharge tube connecting interface connected with a coolant discharge tube configured to feed the coolant to the manifold from the head, in each of the plurality of heads, the first supply tube connecting interface and the first discharge tube connecting interface are aligned in the first direction, the second supply tube connecting interface and the second discharge tube connecting interface are aligned in the first direction, and the coolant supply tube connecting interface and the coolant discharge tube connecting interface are aligned in the first direction, the first supply tube connecting interface, the first discharge tube connecting interface, the coolant supply tube connecting interface, and the coolant discharge tube connecting interface are disposed staggered along the first direction, the first supply tube connecting interface, the first discharge tube connecting interface, the second supply tube connecting interface, and the second discharge tube connecting interface are disposed staggered along the first direction, and the first supply tube connecting interface, the first discharge tube connecting interface, the second supply tube connecting interface, the second discharge tube connecting interface, the coolant supply tube connecting interface, and the coolant discharge tube connecting interface are disposed so as to be contained within a plane-of-projection in the up-down direction of the sub-tank.

21. The head system according to claim 20, wherein the second supply tube connecting interface, the second discharge tube connecting interface, the coolant supply tube connecting interface, and the coolant discharge tube connecting interface are disposed staggered along the first direction.

22. The head system according to claim 17, wherein an upper surface of each of the plurality of heads is provided with:

a liquid channel interface configured to be connected with one of the plurality of liquid channels;

a coolant supply tube interface configured to be connected with a coolant supply tube configured to feed the coolant to the head from the manifold; and a coolant discharge tube interface configured to be connected with a coolant discharge tube configured to feed the coolant to the manifold from the head, the liquid channel interface, the coolant supply tube interface, and the coolant discharge tube interface are each tubular extending in the up-down direction, and upper ends of the liquid channel interface, the coolant supply tube interface, and the coolant discharge tube interface are positioned at the same height as each other.

23. The head system according to claim 22, wherein the manifold includes a supply manifold connected with the coolant supply tube and a discharge manifold connected with the coolant discharge tube, the supply manifold and the discharge manifold are aligned in the up-down direction, and in each of the plurality of heads, the coolant supply tube interface and the coolant discharge tube interface are provided on one side in the second direction of the liquid channel interface, and the supply manifold and the discharge manifold respectively fluidly connected to the coolant supply tube interface and the coolant discharge tube interface are provided on the other side in the second direction of the liquid channel interface.

24. The head system according to claim 23, wherein the coolant supply tube includes: a first portion extending downwardly from the supply manifold; and an angle-variable first bending joint attached to a lower end of the first portion, the coolant discharge tube includes: a second portion extending downwardly from the discharge manifold; and an angle-variable second bending joint attached to a lower end of the second portion, a channel length of the first portion and a channel length of the second portion differ from each other, a channel length of the angle-variable first bending joint and a channel length of the angle-variable second bending joint are the same as each other, and in a case that the coolant supply tube and the coolant discharge tube are connected to the coolant supply tube interface and the coolant discharge tube interface, the first bending joint and the second bending joint is configured to enable positional adjustment.

25. A printing device comprising:

a conveying device configured to convey a medium in a conveying direction along a conveying surface;

a plurality of head systems; and a frame configured to support the plurality of head systems, wherein each of the plurality of head systems is a head system according to claim 1, and the frame supports the plurality of head system such that the conveying direction matches with the second direction of each of the plurality of head systems, and nozzle surfaces of the plurality of heads face the conveying surface.

* * * * *